(12) United States Patent
Angermann et al.

(10) Patent No.: US 11,530,004 B2
(45) Date of Patent: Dec. 20, 2022

(54) TOWING VEHICLE COUPLING SENSOR APPARATUS HAVING FRICTION-TYPE FOLLOWER

(71) Applicant: WESTFALIA-AUTOMOTIVE GMBH, Rheda-Wiedenbrück (DE)

(72) Inventors: Kay Angermann, Döbeln (DE); Martin Duker, Gütersloh (DE); Jürgen Peitz, Langenberg (DE); Bernhard Sielhorst, Rheda-Wiedenbrück (DE)

(73) Assignee: WESTFALIA-AUTOMOTIVE GMBH

( * ) Notice: Subject to any disclaimer, the term of this patent is extended or adjusted under 35 U.S.C. 154(b) by 166 days.

(21) Appl. No.: 17/257,649

(22) PCT Filed: Jul. 3, 2019

(86) PCT No.: PCT/EP2019/067826
§ 371 (c)(1),
(2) Date: Jan. 4, 2021

(87) PCT Pub. No.: WO2020/007903
PCT Pub. Date: Jan. 9, 2020

(65) Prior Publication Data
US 2021/0206217 A1     Jul. 8, 2021

(30) Foreign Application Priority Data
Jul. 4, 2018   (DE) ................. 10 2018 116 192.1

(51) Int. Cl.
*B62D 53/08*    (2006.01)
*B60D 1/01*     (2006.01)
(Continued)

(52) U.S. Cl.
CPC ............. *B62D 53/08* (2013.01); *B60D 1/015* (2013.01); *B60D 1/06* (2013.01); *B60D 1/62* (2013.01)

(58) Field of Classification Search
CPC ................................. B60D 1/015; B60D 53/08
See application file for complete search history.

(56) References Cited

U.S. PATENT DOCUMENTS

2020/0292353 A1*   9/2020   Sielhorst .............. G01D 11/245
2020/0331441 A1*  10/2020   Sielhorst .............. B62D 15/023

FOREIGN PATENT DOCUMENTS

AT            504820         8/2008
DE       102009057871         6/2011
(Continued)

OTHER PUBLICATIONS

Patent Cooperation Treaty (PCT), International Search Report and Written Opinion for Application PCT/EP2019/067826 filed Jul. 3, 2019, dated Sep. 19, 2019, International Searching Authority, EP.

*Primary Examiner* — Kevin Hurley
(74) *Attorney, Agent, or Firm* — McDonald Hopkins LLC

(57) ABSTRACT

The invention relates to a sensor device for a towing vehicle coupling (60) or as a component of a towing vehicle coupling (60), with which a trailer vehicle (A), in particular a semitrailer, can be coupled to a towing vehicle (Z), in particular a truck, wherein the towing vehicle coupling (60) has a coupling element (61) for detachably coupling a coupling counter element (81), which are or can be secured to the towing vehicle (Z) and the trailer vehicle (A), and in the coupled state forming a joint (95), they can rotate relative to one another about at least one joint rotational axis, wherein the sensor device (610) has a follower (620), which is mounted such that it can rotate relative to the coupling element (61) about a follower rotational axis (M), and which can rotate about the follower rotational axis (M) by rotationally following the coupling counter element (81) during rotation about the at least one joint rotational axis for detecting a rotation of the coupling counter element (81) relative to the coupling element (61) about the at least one joint rotational axis, wherein the follower (620) has at least one frictional connection surface (681) for frictional contact with the coupling counter element (81), and wherein the sensor device (610) has at least one sensor for detecting a (Continued)

Figure 1:
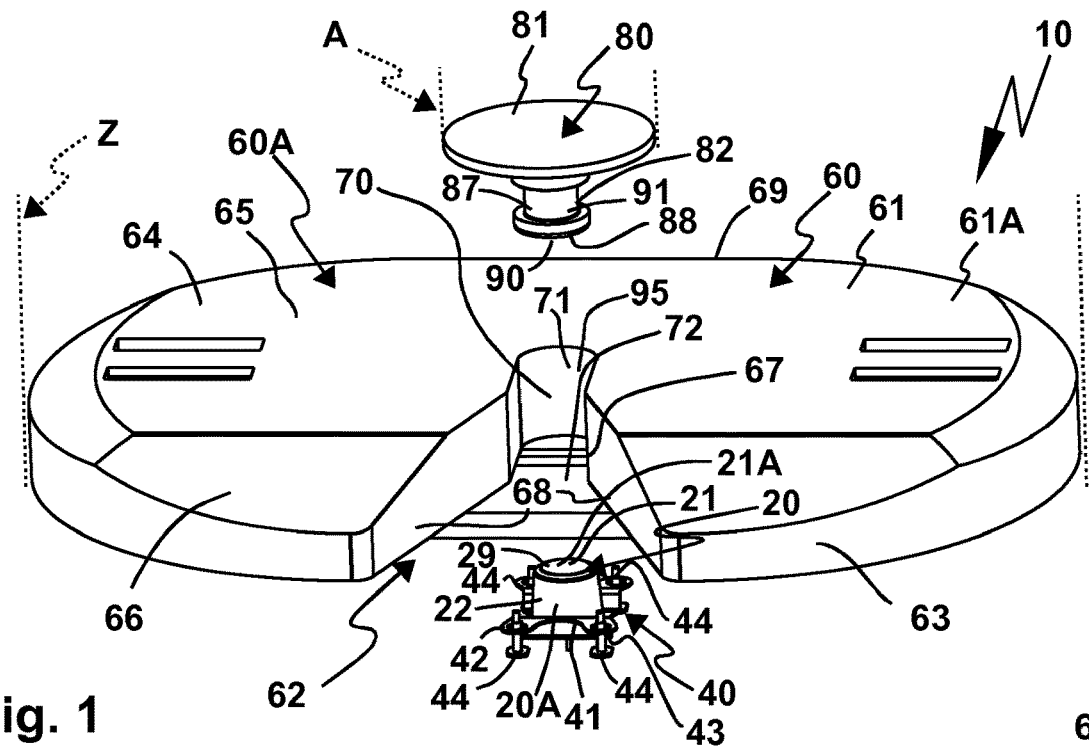

respective rotational position of the follower (620) relative to the coupling element (61) in relation to the follower rotational axis (M). It is provided that a plurality of particles (683) for contacting the coupling counter element (81) is arranged on the at least one frictional connection surface (681) and/or that the coupling has a counter follower element (990) which is arranged or can be arranged on the coupling counter element (81) and which has a follower surface (690) having a plurality of particles (683) for contacting the frictional connection surface (681).

36 Claims, 10 Drawing Sheets

(51) Int. Cl.
*B60D 1/06* (2006.01)
*B60D 1/62* (2006.01)

(56) References Cited

FOREIGN PATENT DOCUMENTS

| | | |
|---|---|---|
| DE | 102015120327 | 5/2017 |
| DE | 102016012663 | 6/2017 |
| EP | 0486693 | 5/1992 |
| EP | 2415620 | 2/2012 |

\* cited by examiner

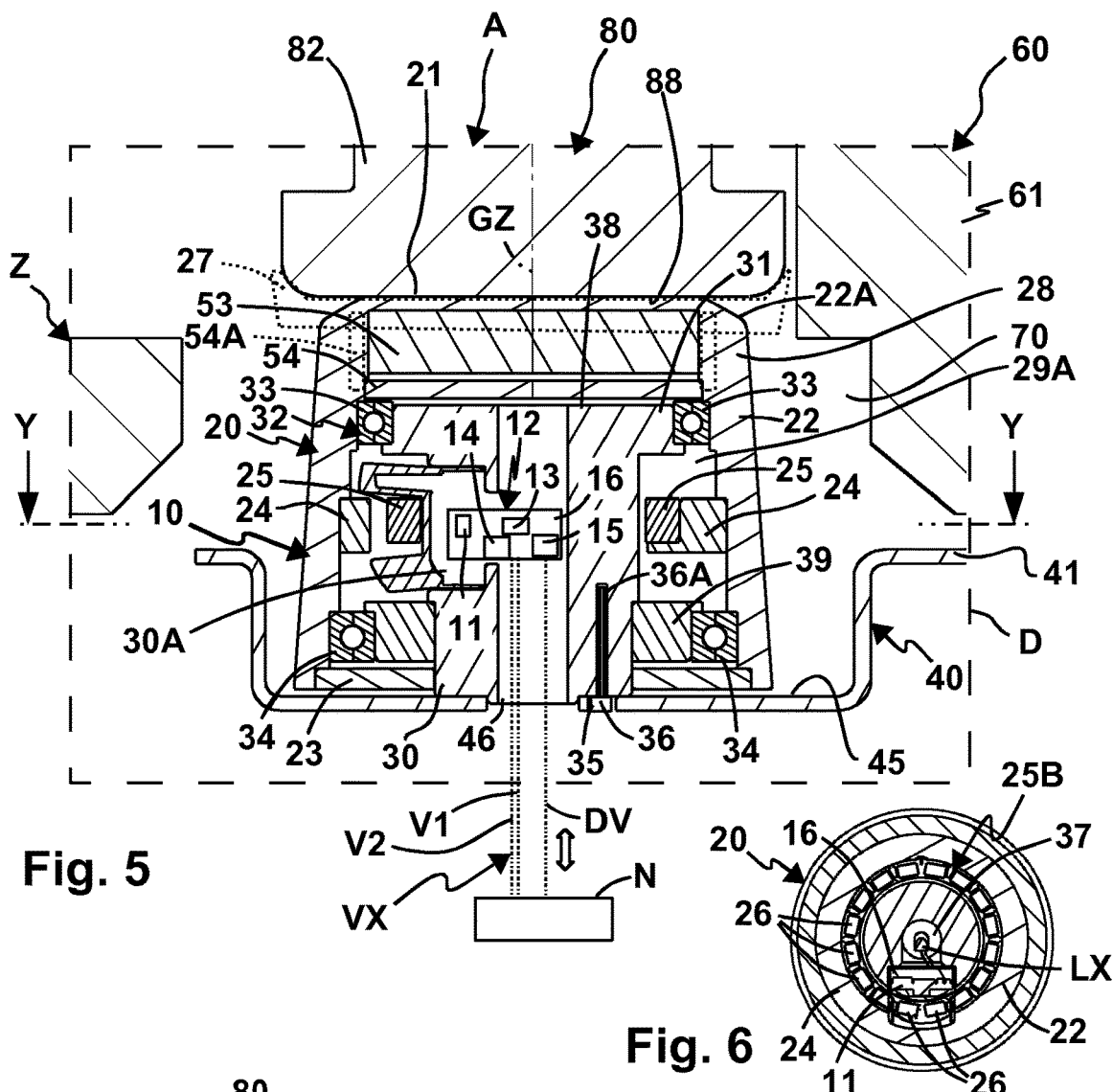
Fig. 5
Fig. 6
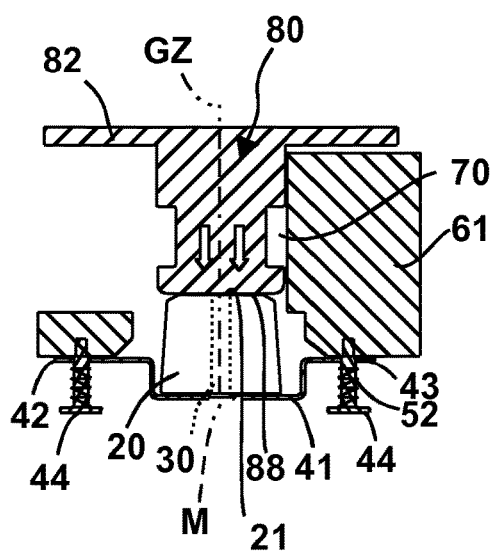
Fig. 7
Fig. 8

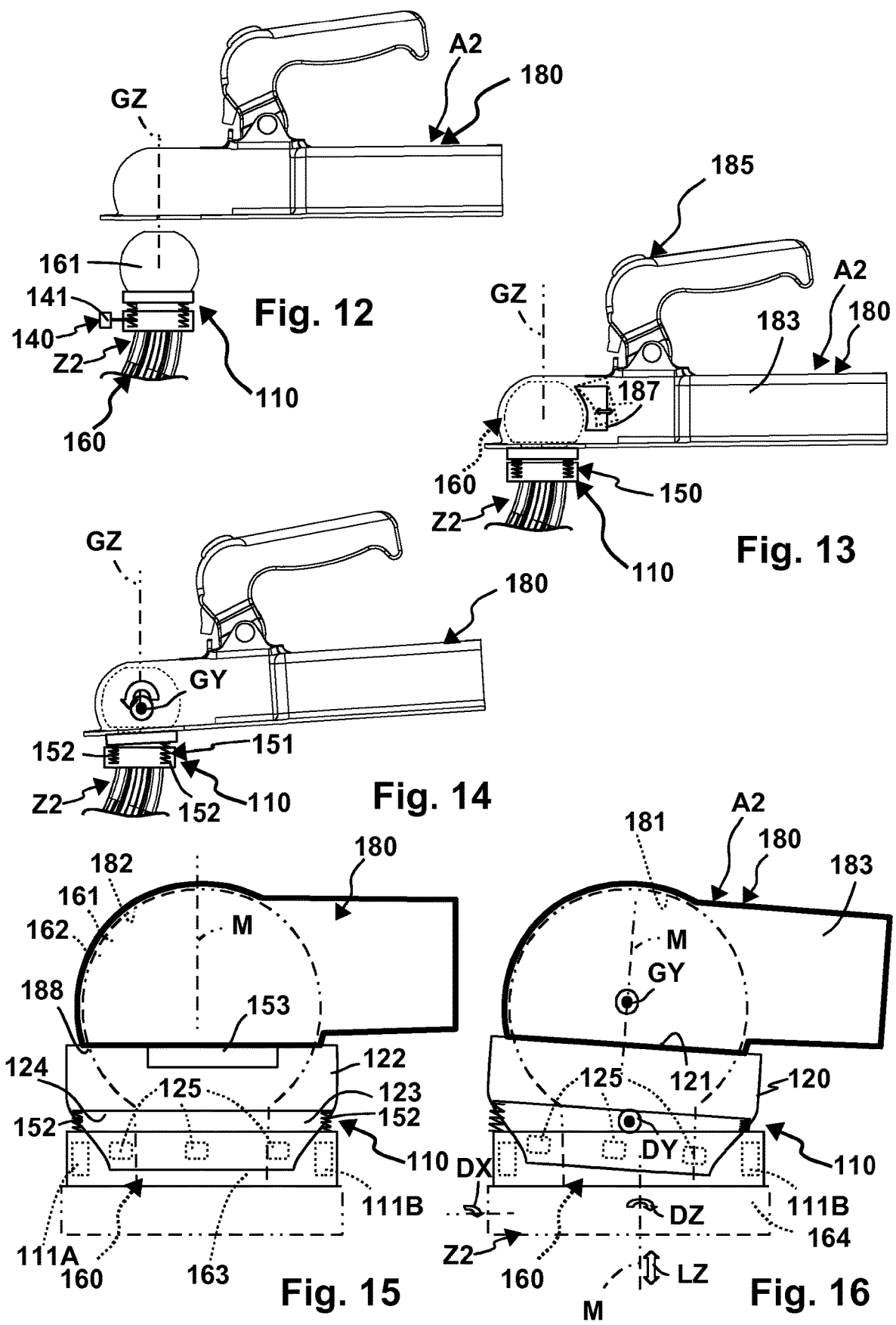

TOWING VEHICLE COUPLING SENSOR APPARATUS HAVING FRICTION-TYPE FOLLOWER

CROSS-REFERENCE TO RELATED APPLICATION

This application is a 35 U.S.C. § 371 national stage application of PCT Application No. PCT/EP2019/067826 filed on Jul. 3, 2019, entitled "VEHICLE COUPLING SENSOR APPARATUS HAVING FRICTION-TYPE FOLLOWER," which claims priority to German Patent Application No. 10 2018 116 192.1 filed on Jul. 4, 2018, each of which are incorporated herein in their entirety by reference.

The invention relates to a sensor device for a towing vehicle coupling or as a component of a towing vehicle coupling, with which a trailer vehicle, in particular a semi-trailer, can be coupled to a towing vehicle, in particular a truck, wherein the towing vehicle coupling has a coupling element for detachably coupling a coupling counter element, which are or can be secured to the towing vehicle and the trailer vehicle, and in the coupled state forming a joint, they can rotate relative to one another about at least one joint rotational axis, wherein the sensor device has a follower, which is mounted such that it can rotate relative to the coupling element about a follower rotational axis, and which can rotate about the follower rotational axis by rotationally following the coupling counter element during rotation about the at least one joint rotational axis for detecting a rotation of the coupling counter element relative to the coupling element about the at least one joint rotational axis, wherein the follower has at least one frictional connection surface for frictional contact with the coupling counter element, and wherein the sensor device has at least one sensor for detecting a respective rotational position of the follower relative to the coupling element in relation to the follower rotational axis.

Such a sensor device is described, by way of example, in EP 2 415 620 A1. The follower is designed as a ring which is rotatably mounted on the outer periphery of a coupling element designed as a ball head. In this case, the coupling counter element is a ball head receptacle, known as a ball socket, which is placed on the coupling ball, and thus the coupling element, and rotatably actuates the follower. Flexible follower projections protrude radially outwards from the follower in relation to the follower rotational axis, which projections are compressed to a certain extent when closing the coupling counter element, specifically the closing jaw thereof, so that a frictional engagement between the coupling element and the follower is achieved.

However, in practice, it may be that the follower projections slide past the surface of the ball socket, so that the follower has a slip. Thus, the rotational position of the follower relative to the coupling element and thus also the rotational position of the coupling counter element relative to the coupling element can no longer be exactly determined.

It is therefore the object of the present invention to provide an improved sensor device.

To achieve the object, it is provided that a plurality of particles for contacting the coupling counter element is arranged on the at least one frictional connection surface and/or that the coupling has a counter follower element which is arranged or can be arranged on the coupling counter element and which has a follower surface having a plurality of particles for contacting the frictional connection surface.

The coupling element is or can be secured to the towing vehicle, and the coupling counter element is or can be secured to the trailer vehicle. In the coupled state of the coupling element and the coupling counter element, the coupling element and the coupling counter element are rotatable relative to one another about at least one joint rotational axis and form a joint.

Thus, on the one hand, it is also possible that the frictional engagement surface of the follower has a plurality of particles, but on the other hand, that a plurality of particles is available on the counter follower element. It is possible that particles are only provided on one of the follower or the counter follower element. However, it is also possible that particles are provided on both the follower and the counter follower element, which particles support the rotational drive by the coupling counter element. The measures explained below, which are advantageous for the frictional engagement surface of the follower or which are expedient for the design of the particles, may also be present in the counter follower element.

If the coupling counter element is a king pin, for example, particles are advantageously provided on the end face thereof facing the follower. However, a part may also be provided for a spherical recess for a coupling element in the form of a ball head, which part is configured as a counter follower element or has a counter follower element and accordingly comprises particles.

For example, the counter follower element can be flexible and/or film-like. For example, the counter follower element can be configured as a plate body which can be secured, in particular releasably, to the coupling element or the coupling counter element. For example, an adhesive surface is provided on the counter follower element for gluing to the coupling counter element.

It is preferable if the counter follower element has a main body made of elastic plastic, rubber or similar. Particles are embedded in the main body or particles are integrated into the main body. For example, the counter follower element can be glued, welded or otherwise secured to the coupling counter element. Securing by means of screwing, riveting or similar is also possible without additional effort. For example, the counter follower element can be configured as a frictional engagement body on which the particles are arranged for rotational drive or for contact with the follower.

The particles of the counter follower element are preferably embedded in a frictional engagement surface, for example elastic plastic, rubber or similar.

However, it is also possible that the counter follower element forms an integral component of the coupling counter element, which is provided for rotational drive of the follower. For example, the particles can be embedded in a surface material of the coupling counter element.

The particles do not cause damage to the coupling counter element, as the follower and the coupling counter element are not or are only slightly movable relative to one another due to the high friction achievable by the particles. Thus, natural or already existing irregularities or inaccuracies of the coupling counter element can lead to an increased frictional engagement between the follower and the coupling counter element if the particles penetrate into these irregularities.

Preferably, the particles are harder than steel. Generally, the coupling counter element is made of metal, in particular steel completely or at least in the region of a follower surface which is provided for contact with the frictional engagement surface of the sensor device.

Together with the coupling counter element, the particles form a frictional pairing that has a high friction. For example, if grease or other similar dirt adheres to the coupling counter element or the follower, this leads to a reduced friction between the follower and the coupling counter element. However, such dirt, grease or the like can easily be moved into spaces between the particles so that the particles protrude with their tips or edges from the "grease layer" or "dirt layer" and to a certain extent dig into or penetrate the surface of the coupling counter element. The coupling counter element can thus easily consist of metal, in particular steel or similar. Even this material has a certain basic surface roughness, into which the particles of the follower penetrate at least partially. Advantageously, this results in its positivelocking rotational drive.

The particles are preferably particularly small. For example, a grain size or particle size is only around 1800-500 μm. However, the particles can be even smaller, for example smaller than 500 μm. Furthermore, even smaller particles of max. 200 μm or max. 100 μm can be provided. Even smaller particles have, for example, a grain size or particle size of 25-50 μm or even of only between 8 and 25 μm.

The particles are preferably polyhedra.

Preferably, polyhedral sections of the particles protrude from the support surface of the follower. The particles as a whole or the sections of the particles which in any case protrude from the support surface include, for example, tetrahedra and/or pentahedra and/or hexahedra and/or heptahedra and/or octahedra and/or enneahedra and/or decahedra and/or hendecahedra and/or tridecahedra and/or tetradecahedra and/or disheptahedra and/or pentadecahedra and/or hexadecahedra and/or heptadecahedra and/or octadecahedra and/or enneadecahedra. However, this list is not exhaustive.

For example, the particles are embedded in a support surface of the follower and protrude in the manner of contact projections from the support surface. Thus, one section of each particle is firmly anchored in the support surface, while another section forms a contact projection for contact with the coupling counter element.

For example, the particles can be embedded in an elastic material, e.g. an elastic layer or an elastic main body, of the follower. The particles protrude from the elastic material in the manner of contact projections. Thus, the particles can move slightly in the direction of the elastic material when the follower contact between the coupling counter element and the follower is established. The elastic layer acts on the particles in the direction of the coupling counter element or in the direction of a frictional engagement contact with the same.

The particles are comparatively hard compared to a material that carries them. Preferably, it is provided that the particles are harder than a material of the follower carrying them, for example a plastic material. The particles protrude from the material. For example, the hardness of the particles is twice or three-times, but preferably four-time or five-times greater than that of the material carrying the particles. Of course, the particles can also be even harder, for example up to ten-times or one hundred-times harder than the carrying material of the follower.

The particles can protrude freely from a support surface of the follower on which they are arranged. However, it is also possible for the particles to be covered by a cover layer on their side facing away from the support surface or the side facing the coupling counter element or intended for follower contact with the coupling counter element. For example, calcium stearate, a wax or similar is suitable for covering the particles. Nevertheless, their usually hard edges and/or tips may protrude from this cover layer, so that contact of the particles with the coupling counter element is easily achieved.

For example, the follower can be directly rotatably mounted on the coupling element. However, it can also be mounted on the coupling element carrier, e.g. a coupling arm. Furthermore, it is also possible for the follower to be rotatably mounted pivoted way from the coupling element on a bearing body which is separate from the coupling element and/or the coupling element carrier thereof.

Also advantageous is a multipart, in particular two-part, configuration of the follower.

It is preferred if the follower has a follower carrier on which a follower body is releasably secured. The at least one frictional engagement surface or an arrangement of a plurality of frictional engagement surfaces with particles is provided on the follower body. The follower carrier is rotatably mounted, by way of example, on the coupling element, the bearing element separate from the coupling element or similar. The follower body itself is the wear part, which can be replaced if necessary. Even if the sensor device is inactive, as it were, this solution offers advantages. It is namely possible to remove the follower body from the follower carrier, so that the follower carrier cannot have a follower contact with the coupling counter element.

The follower carrier forms, so to speak, the rotatably mounted component, while the follower body is attached in another way to the follower carrier, by way of example, latched, glued, clipped, screwed or similar.

The follower, in particular the follower carrier, can by way of example form a protective housing for the at least one sensor and/or an evaluation device of the sensor.

The follower, in particular the follower body, expediently has a slide bevel for sliding on the coupling counter element. Thus, the coupling counter element cannot damage the follower body when coupling the coupling counter element to the coupling element or easily come into follower contact with the follower body. The slide bevel for the coupling counter element is preferably provided on an edge region of the follower body.

The follower body can surround the follower carrier ring. This variant is particularly advantageous if the follower body, in particular a coupling ball, is arranged directly on the coupling element.

It is also advantageous if the follower body forms a cap or a cover for the follower carrier. By way of example, the frictional engagement surfaces are then arranged on the end face and/or radially outward on the follower body.

It is advantageous if the follower body protrudes in the manner of a mushroom or similar from the follower carrier. By way of example, it is preferred if the follower body protrudes transversely to the follower rotational axis from the follower carrier.

The frictional engagement surface, which has the particles, is penetrated by the follower rotational axis, for example. However, it is also possible for the frictional engagement surface with the particles to be arranged radially outside with respect to the follower rotational axis.

The follower body expediently has at least one magnet for generating a magnetic attraction in the direction of the coupling counter element. For example, the magnet can be arranged next to, in particular below, the follower body. It is preferred if the magnet is arranged on the follower body or is received in the follower body. Thus, for example, a magnet or an arrangement of several magnets is embedded in the follower body. For example, the magnet can be arranged on an end face of the follower body. For example, the follower rotational axis passes through the magnet. The frictional engagement surface with the particles or a frictional engagement surface with the particles can be arranged directly on the magnet, in particular on the flat side or end face thereof.

The particles expediently have a plurality of regularly or irregularly oriented edges. For example, the particles can be arranged chaotically or randomly on the frictional engagement surface. In particular, irregularly oriented edges then appear. However, irregularly oriented edges can also appear such that the particles are obtained from a solid material which is broken. In particular if the material does not have a crystalline structure, chaotic or irregular edges are formed during breaking.

The edges can also result from a crystalline structure of the material of the particles, for example.

For example, the particles can be scattered openly on the frictional engagement surface or also scattered closed. With open scattering, there are gaps between the particles, so that, for example, a support surface between the particles is at least partially exposed. On the other hand, the closed scattered particles lie so close together that there are no open gaps or free sections of the support surface carrying the particles between them.

It is also possible that the frictional engagement surface has zones with different densities of particles. For example, edge zones or radially outer zones of the frictional engagement surface may have a higher density of particles than radially inner zones with respect to the follower rotational axis.

Furthermore, it is possible that the frictional engagement surface has at least one region without particles. For example, the frictional engagement surface can have a support surface made of rubber or another similar frictional engagement material which can itself independently establish a frictional engagement with the coupling counter element.

Furthermore, it is possible that the particles are provided on zones of the frictional engagement surface which are spaced apart from one another. For example, the zones can have an angular spacing or a radial spacing or both. For example, annular segments can thus be provided which extend around the follower rotational axis. Even if frictional engagement surfaces with particles are provided radially outside relative to the follower rotational axis, i.e. on a radial outer periphery of the follower or the follower body, spacings between these frictional engagement surface zones may be provided, in particular of the frictional engagement surfaces are arranged on follower projections in the manner of the follower according to EP 2 415 620 A1.

The particles are preferably evenly distributed on the frictional engagement surface such that their edges substantially run within an envelope. In particular, an envelope of the particles defining the contact region with the coupling counter element is a flat surface or an even surface. This is advantageous, for example, with a coupling counter element in the form of a king pin or similar. However, the envelope can also be a spherical segment surface, for example if the coupling counter element comprises a ball cup or a spherical recess.

At least one positivelocking contour is preferably arranged on the follower, for example a follower projection, for a positivelocking contact with the coupling counter element. The follower preferably has an arrangement of a plurality of follower projections. Thus, both a material engagement and frictional engagement of the follower with the coupling counter element can be achieved.

The at least one positivelocking contour or the at least one follower projection is preferably at least five-times larger, in particular at least ten-times, at least 20-times or at least 30-times, particularly preferably at least 100-times larger than the particles which are arranged on the positivelocking contour or the follower projection.

The positivelocking contour, for example a latch contour, of the follower expediently has a frictional engagement surface with a plurality of particles for contact with the coupling counter element. A combination of positivelocking contour with and without particles on the respective contact surfaces for the coupling counter element is also possible. For example, in the case of follower projections which project radially outwards from the follower rotational axis, follower projections with and without particles are provided, e.g. alternately next to one another or at irregular spacings.

The follower preferably has at least two, preferably a plurality of main bodies protruding from the main body of the follower which have a spacing, e.g. an angular spacing or a longitudinal spacing or both, from one another. At least one follower projection is provided with a frictional engagement surface with a plurality of particles on an end face for contact with the coupling counter element. For example the follower projections can be oriented radially outwards relative to the follower rotational axis.

The follower expediently has at least one elastic or sprung section for elastic or sprung deformation by the coupling counter element. For example, this elastic section can be the one on which the frictional engagement surface is also located and where the particles are present. However, it is also possible for the elastic section to be provided in a layer on which a support layer for the particles is also provided.

Furthermore, it is advantageous if the sensor device has a magnet arrangement for providing a magnetic attraction acting on the follower in the direction of the coupling counter element. The magnet arrangement may comprise one or more magnets which cooperate, by way of example, with the in itself ferromagnetic coupling counter element.

The magnet arrangement may comprise permanent magnets and/or electromagnetically acting magnets. By way of example, the magnet arrangement comprises one or more electrical coils.

The magnet arrangement may have one or more flux-conducting elements for guiding the magnetic flux which a permanent magnet or electromagnet of the magnet arrangement generates. By way of example, such a flux conducting element, in particular a soft magnetic flux conducting element, is configured and provided for directing or guiding the magnetic flux in the direction of the coupling counter element. The flux guide element is suitable, by way of example, for reinforcing or aligning a force of attraction of the follower in the direction of the coupling counter element.

The magnet arrangement can be configured or arranged for the actuation and excitation of the at least one sensor. Therefore, the magnet arrangement is used twice, as it were, namely for the generation of the force of attraction in the direction of the coupling counter element, but also for the excitation or actuation of the at least one sensor.

Furthermore, however, it is also possible for the magnet arrangement to have a screening device for screening the at least one sensor from magnetic influences of the magnet arrangement. Thus, by way of example, the magnetic field of the magnet arrangement can be directed away from the sensor or around the sensor. It should be mentioned at this point that a combination of magnetic screening and magnetic actuation of the sensor is also possible. By way of example, conduction of the magnetic flux or magnetic field of the magnet assembly may occur around a section of the sensor at another point in order to avoid faulty actuation while still directing the magnetic field towards the sensor.

The follower may have a follower ring or annular section. Several part-rings, which are coupled or connected together, may also be present in the follower. An annular or partially annular peripheral follower contour in the follower is also advantageous.

The follower expediently has a dome-shaped or towerlike follower body. The follower body can be configured by way of example in the manner of a hood or a cover.

The sensor device expediently comprises at least one sensor or sensor transmitter mounted rotatably about the follower rotational axis, in particular a ring comprising an arrangement of a plurality of sensors or sensor transmitters. The rotatably mounted sensor or sensor transmitter is rotatably coupled or rotationally connected to the follower. Therefore, when the follower rotates about the follower rotational axis, it carries with it the at least one sensor or sensor transmitter.

Some designs of the particles will be described in detail in the following. It is understood that particles of different types may be present on the frictional engagement surface, i.e. mixtures and combinations of the particle variants presented below are easily possible:

At least some of the particles expediently has a crystalline structure or are mineral. However, the particles can also be made of a rock material.

Preferably, it is further provided that at least some of the particles are generated by breaking or crushing a hard base material, such as rock or quartz.

The particles can comprise one or a plurality of the following material or be formed thereof:

Preferably it is provided that the particles contain or are formed by metal, in particular metal swarf or metal particles, and/or ceramic material and/or stone material and/or stone and/or corundum and/or quartz and/or diamond and/or cubic boron nitride and/or aluminium oxide. The sand is preferably a broken sand or crushed sand. The particles can comprise or be formed of silicon carbide or silicon.

By breaking and/or crushing or similar, the abovementioned basically hard materials are reduced to small pieces, whereby the particles are formed.

For example, the particles can be metallic and/or can comprise metal particles. Preferably, the particles comprise or are formed by a hard metal granulate, for example. However, the particles can also comprise or be formed by metal swarf.

However, the particles can also comprise or be formed by so-called blasting media, which are suitable for blasting workpieces, for example.

The particles preferably comprise or are formed by corundum. For example, natural corundum, precious corundum, normal corundum, electrocorundum and aluminium oxide ($Al_2O_3$) are listed. However, other corundums, for example so-called white corundum and brown corundum, are also suitable for the particles.

Advantageously, the particles can comprise or be formed by zirconia corundum, for example. This has a microcrystalline structure that repeatedly releases sharp breaking edges when worn, e.g. when subjected to force, friction or similar by the coupling counter element. This results in a self-sharpening effect, so to speak.

Furthermore, the particles can comprise or be formed by iron(III) oxide ($Fe_2O_3$) and/or sodium oxide ($Na_2O$) and/or calcium oxide (CaO) and/or silicon oxide ($SiO_2$) and/or titanium(IV) oxide or titanium dioxide ($TiO_2$).

The frictional engagement surface can also comprise particles obtained from melt chamber slag, for example by breaking it. The melt chamber slag or the particles obtained therefrom are preferably angular. The melt chamber slag and/or the particles obtained therefrom can contain iron or be iron-free.

The particles can also consist of glass or contain glass. For example, the particles particularly contain or are formed by angular glass granulate and/or glass beads.

Hard plastics are also suitable for the particles. For example, the particles can comprise or be formed by a plastic granulate, in particular a sharp-edged plastic granulate. For example, the plastic granulate can be or comprise a thermoset plastic granulate and/or polyamide plastic granulate and/or a polycarbonate plastic granulate.

The particles can also be very fine grained or small. For example, the particles can comprise calcite powder flour, glass powder flour, stone powder flour or similar.

For example, the particles can be glued to a carrier material of the follower with glue, in particular natural glue and/or with plastic resin. For example, a so-called natural glue binding or resin binding, in particular a full resin binding, of the particles with the carrier material is easily possible. However, a so-called mixed binding of the particles with the carrier material can also be provided. Thus, natural glue is used for the basic binding and synthetic resin for the top binding.

It is advantageously provided that the follower for providing or maintaining a follower coupling to the coupling counter element is movably supported with at least one degree of freedom of movement different from the rotation about the follower rotational axis, in particular at least one degree of freedom of rotation relative to the coupling element.

It is a basic concept here that the follower is mounted not only rotatable about the follower rotational axis relative to the ball element, but also with one or more further degrees of freedom of movement, which differ from the rotatability about the follower rotational axis or the degree of freedom of rotation about the follower rotational axis. This allows the follower to, so to speak, be floated up into abutment or interconnection with the coupling counter element, by way of example a ball coupling.

The follower can be mounted directly on the coupling element. By way of example, a bearing recess for the follower, in particular a bearing groove, is provided on the coupling element.

However, it is preferred if the follower is mounted on a bearing body separate from the coupling element so that it is rotatable about the follower rotational axis. The bearing body is suitable, by way of example, for retrofitting a preexisting trailer coupling or towing vehicle coupling.

A preferred embodiment provides that the coupling element is a coupling ball and the coupling counter element is a coupling recess of a towing coupling of a trailer. The coupling element designed as a coupling ball expediently protrudes from a coupling arm or is arranged on a free end region of a coupling arm.

However, it is also possible for the sensor device to be arranged or arrangeable on what is known as a fifth-wheel coupling, in which the coupling element has a coupling recess, by way of example a coupling jaw for receiving a king pin of the coupling counter element. Thus, in this case, the receptacle is provided on the towing vehicle whereas the component engaging in the receptacle is present on the trailer vehicle.

Figure 4:
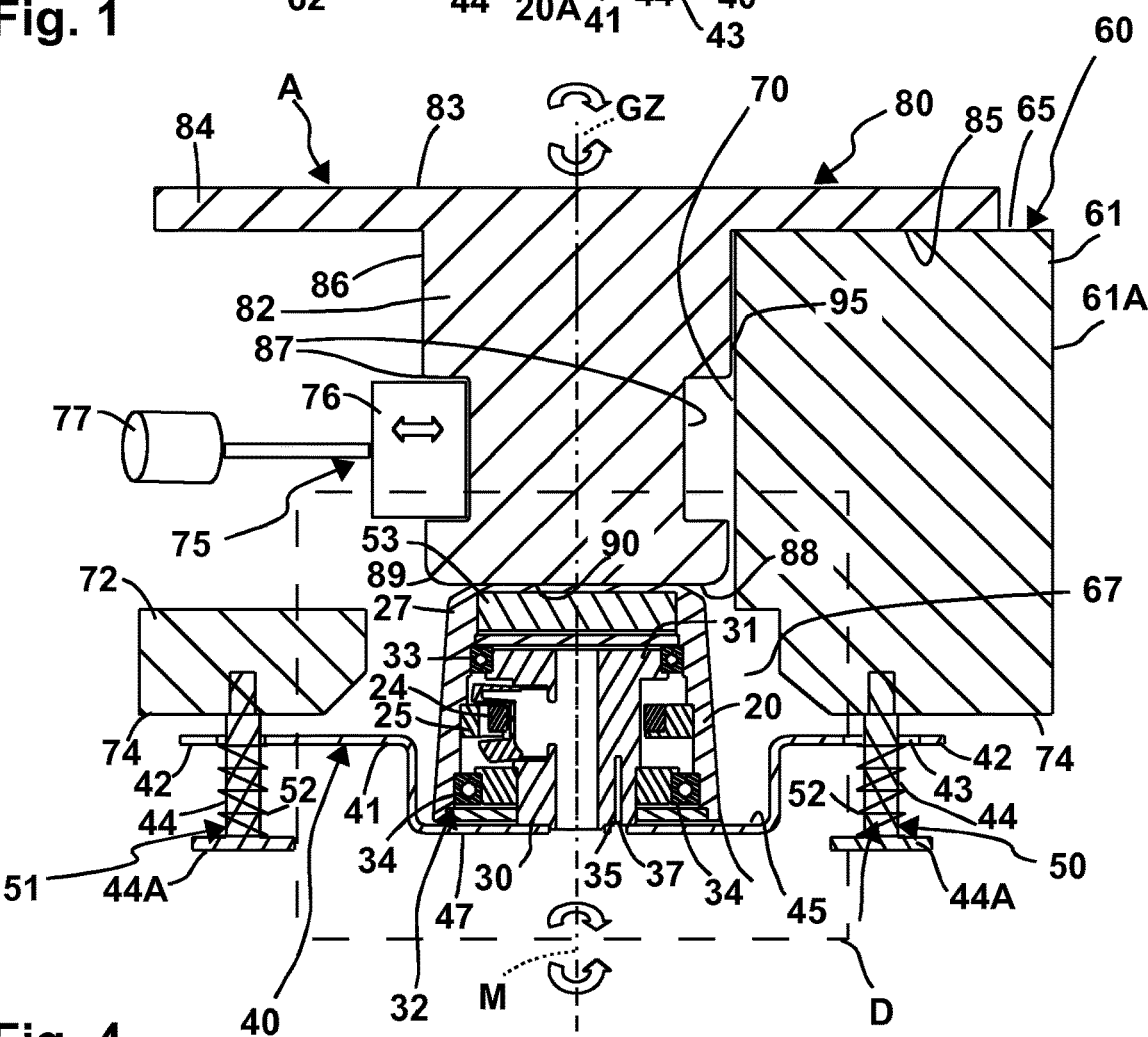
Figure 2:
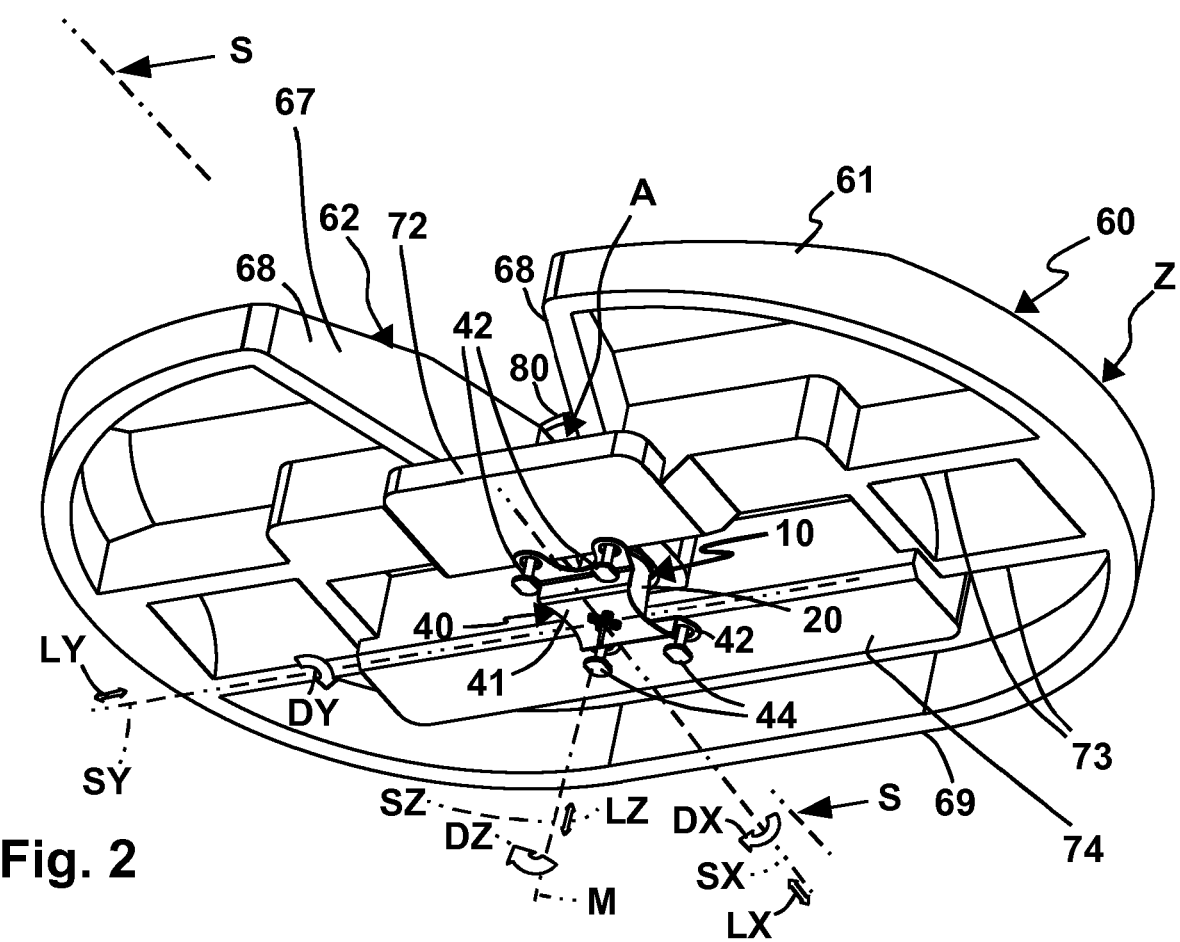
Figure 3:
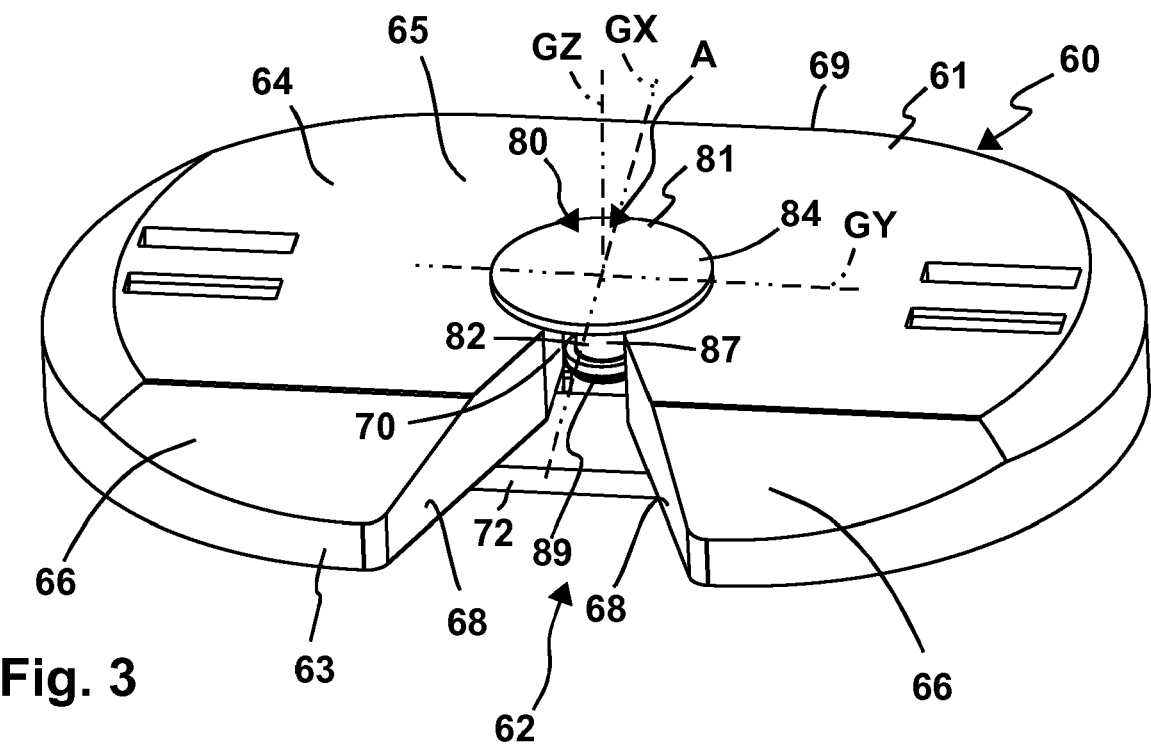
Figure 9:
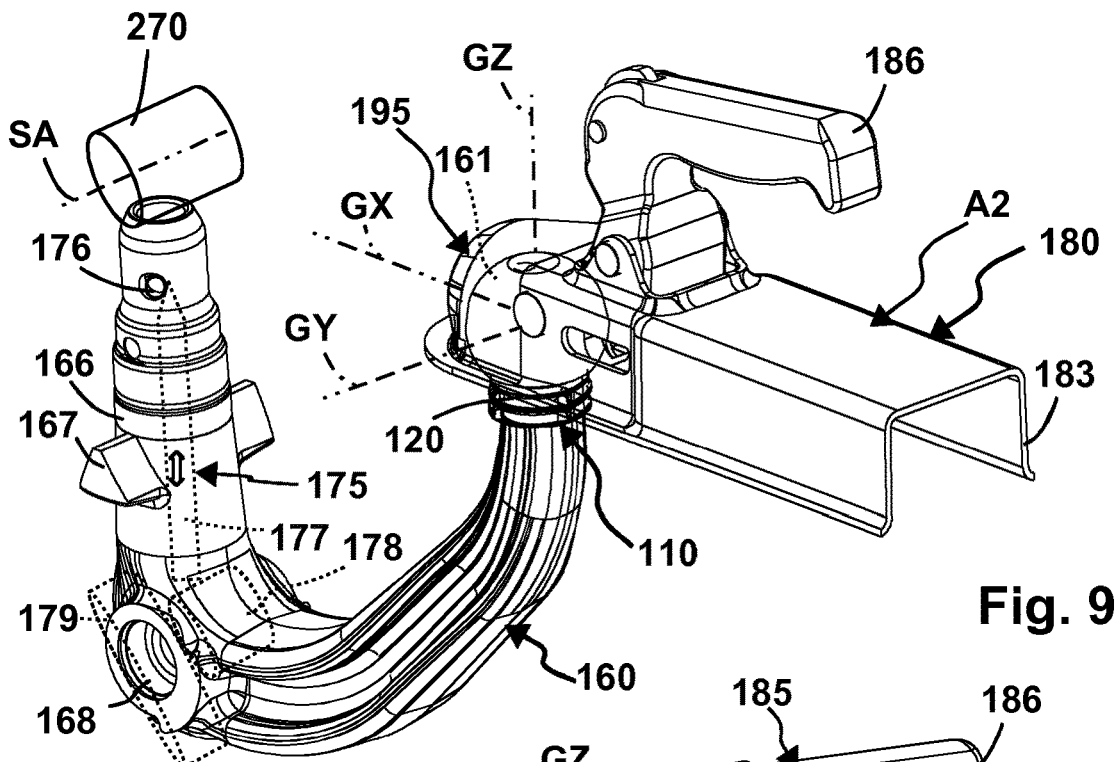
Figure 10:
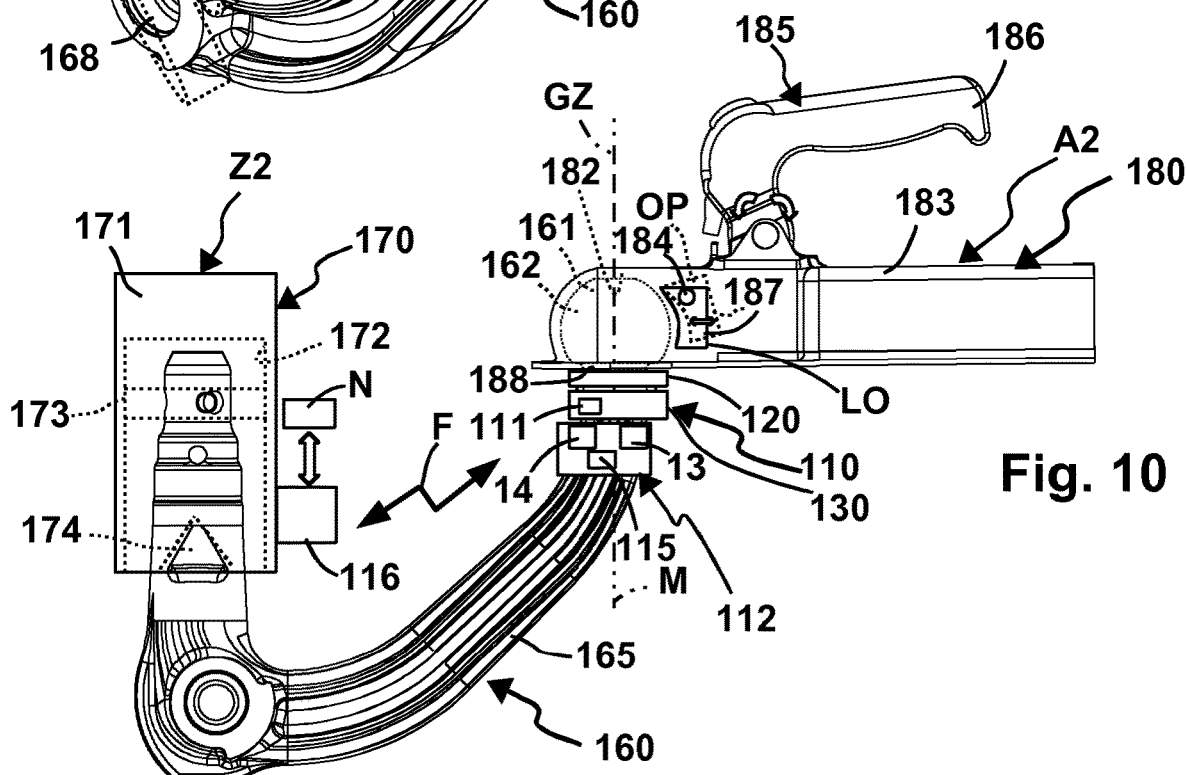
Figure 11:
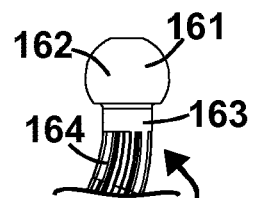
Figure 17:
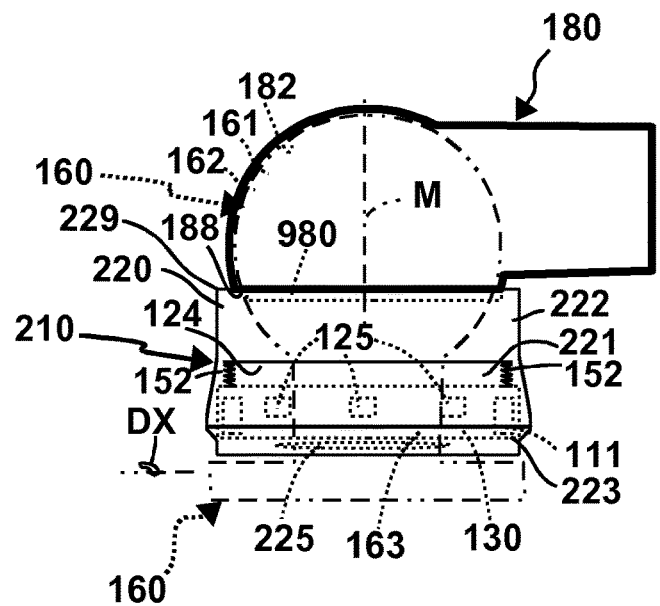
Figure 18:
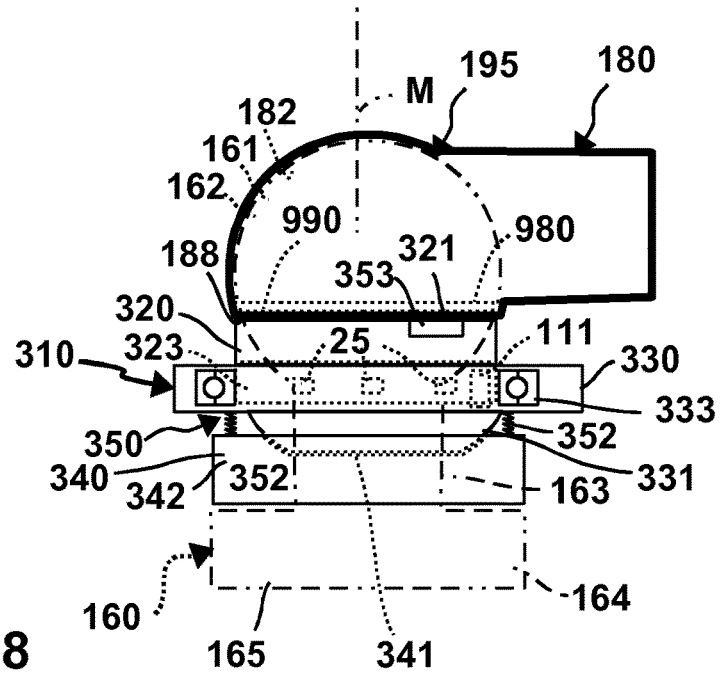
Figure 34:
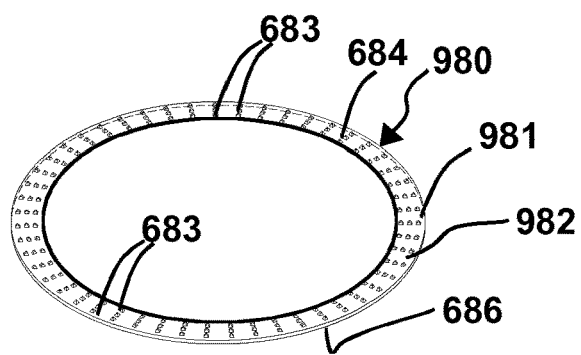
Figure 19:
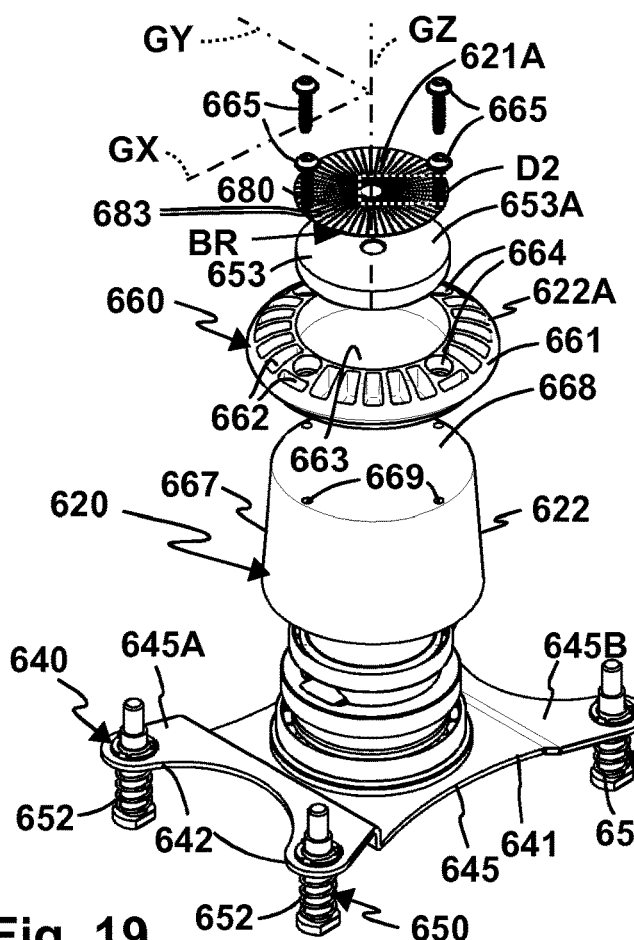
Figure 20:
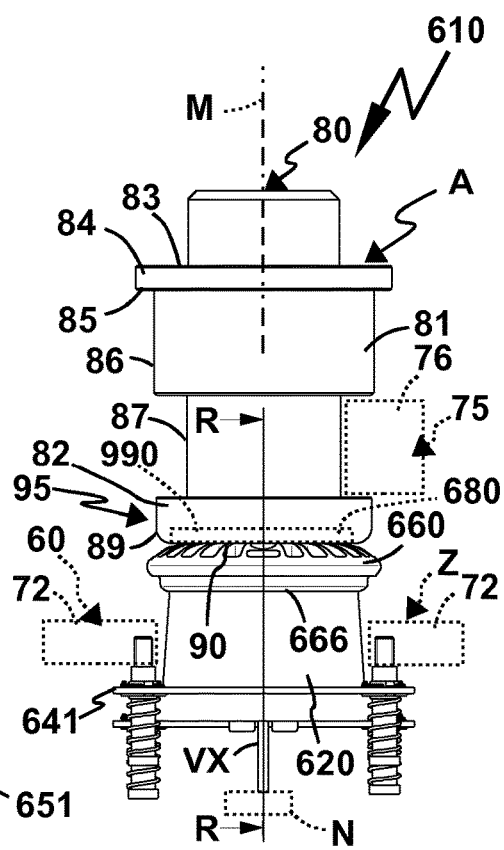
Figure 21:
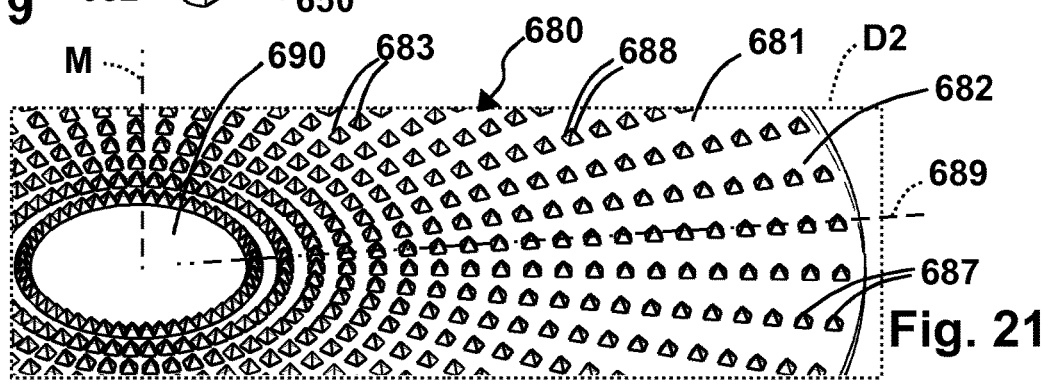
Figure 22:
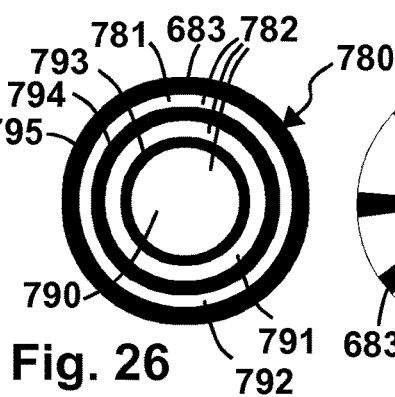
Figure 26:
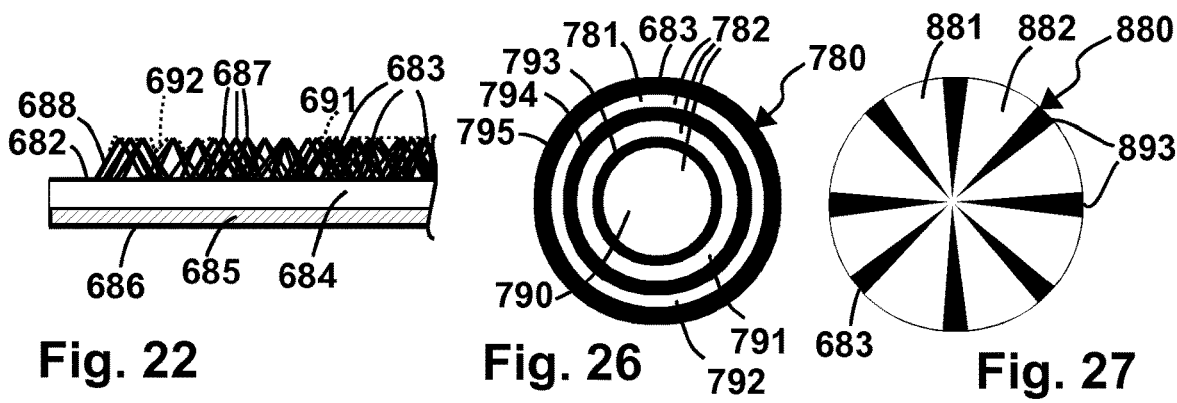
Figure 27:
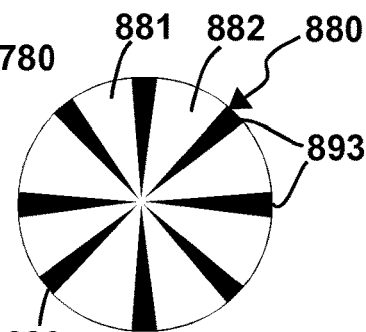
Figure 24:
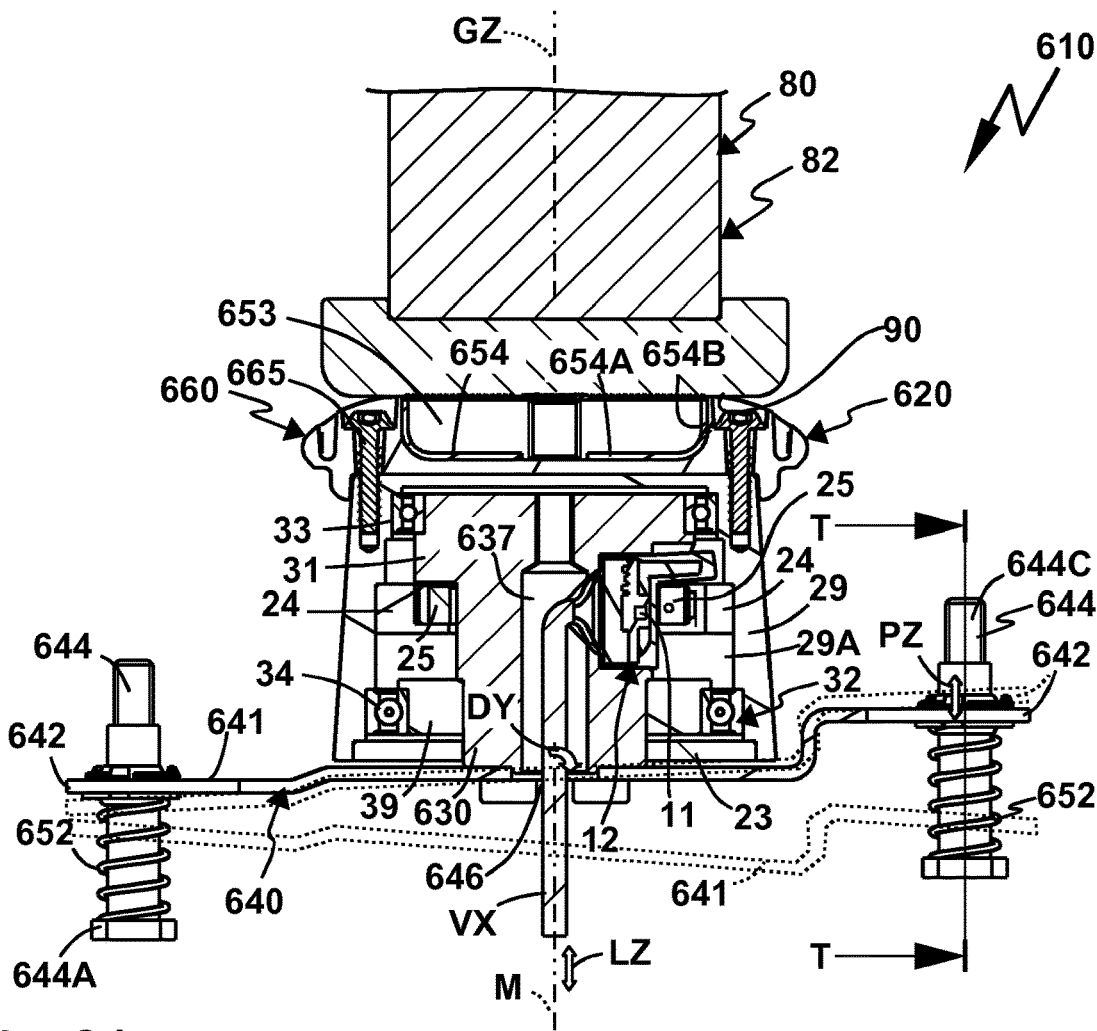
Figure 23:
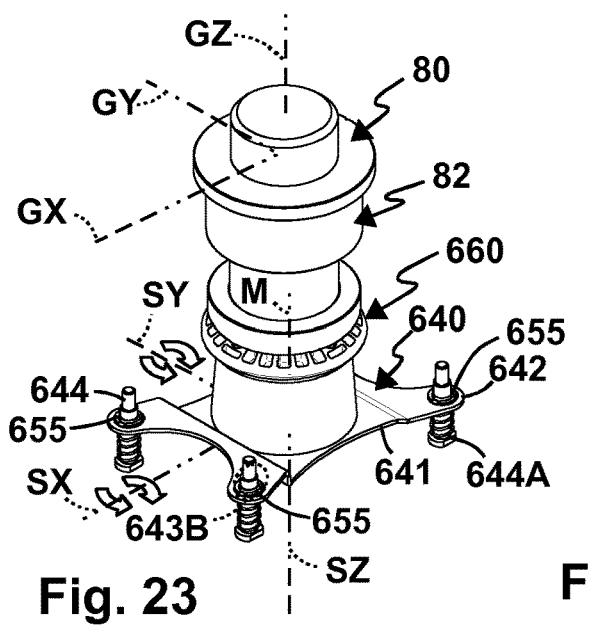
Figure 25:
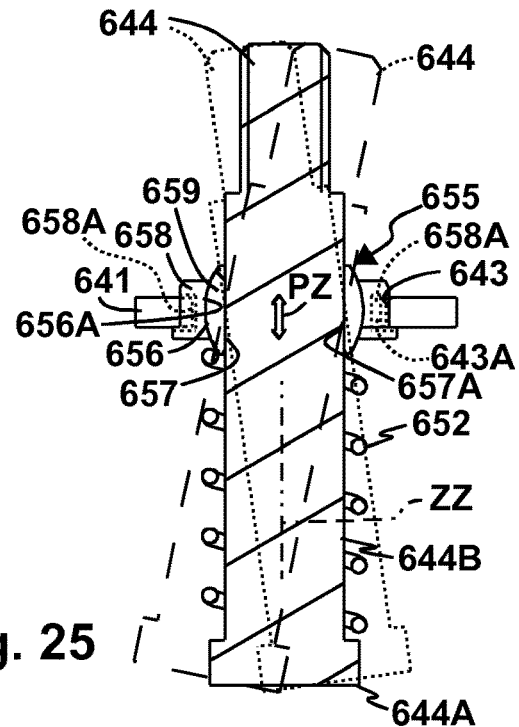
Figure 28:
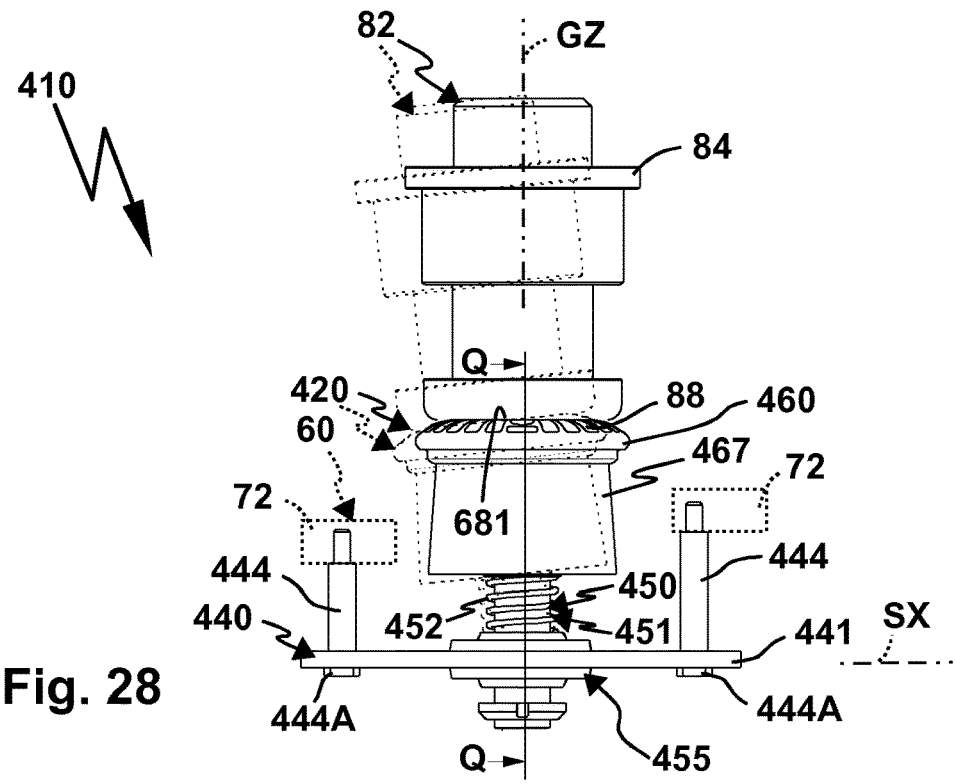
Figure 29:
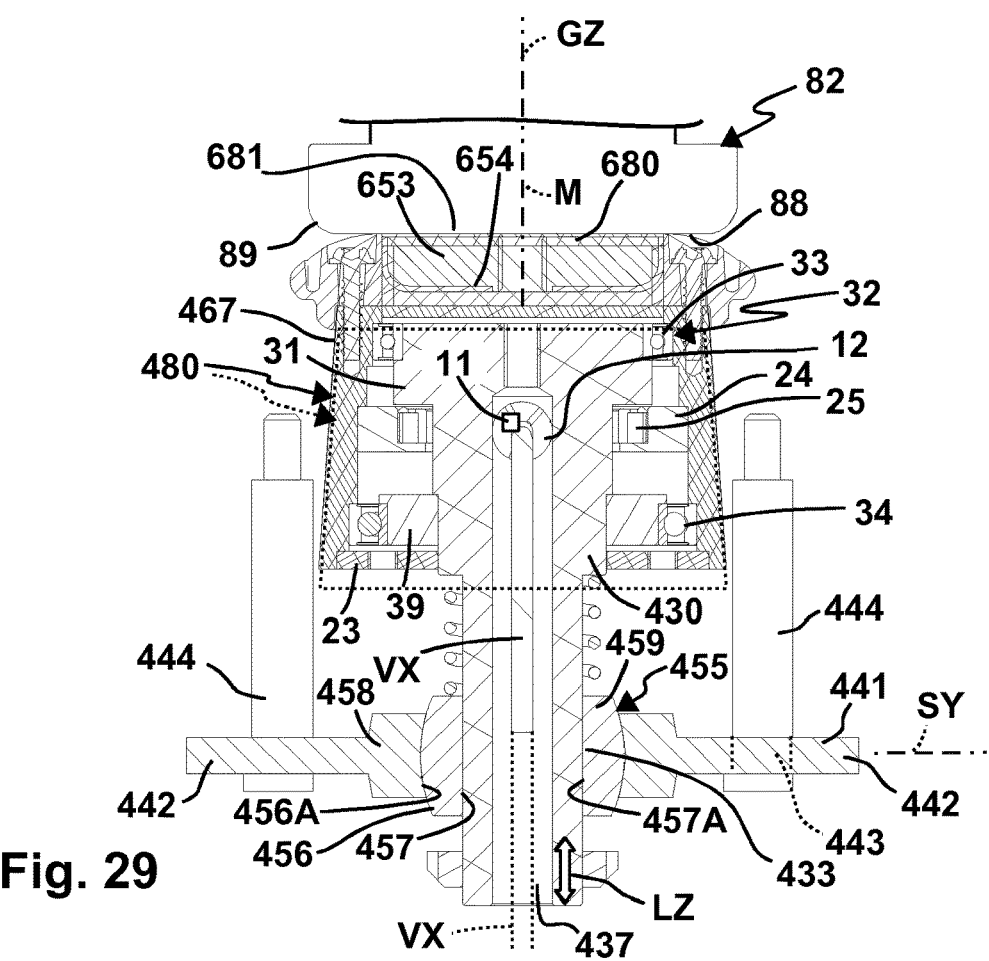
Figure 32:
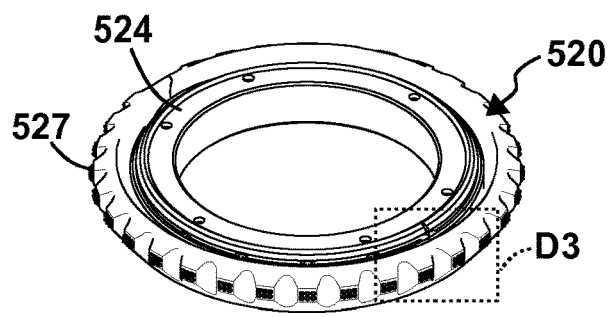
Figure 33:
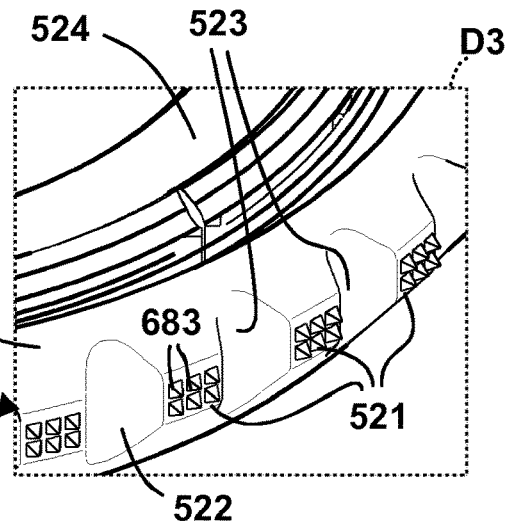
Figure 31:
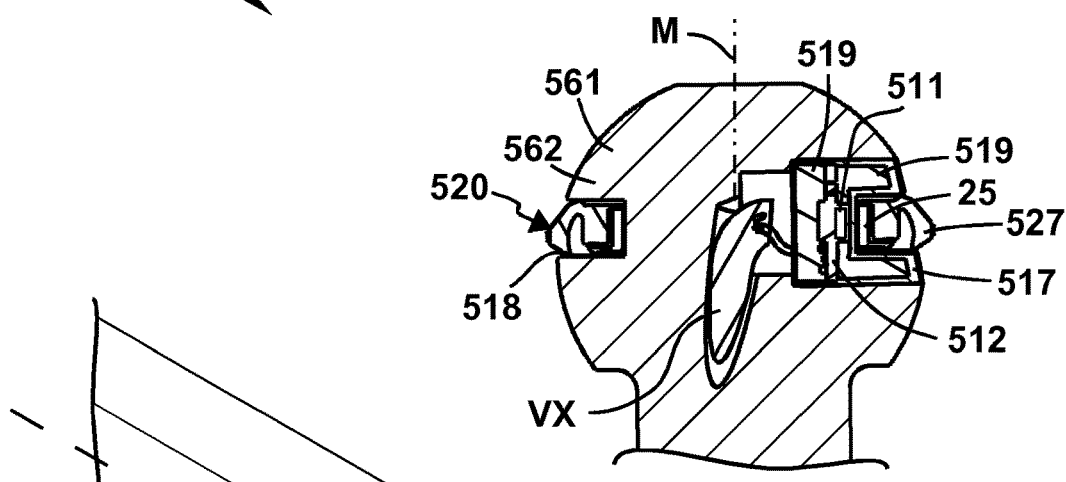
Figure 30:
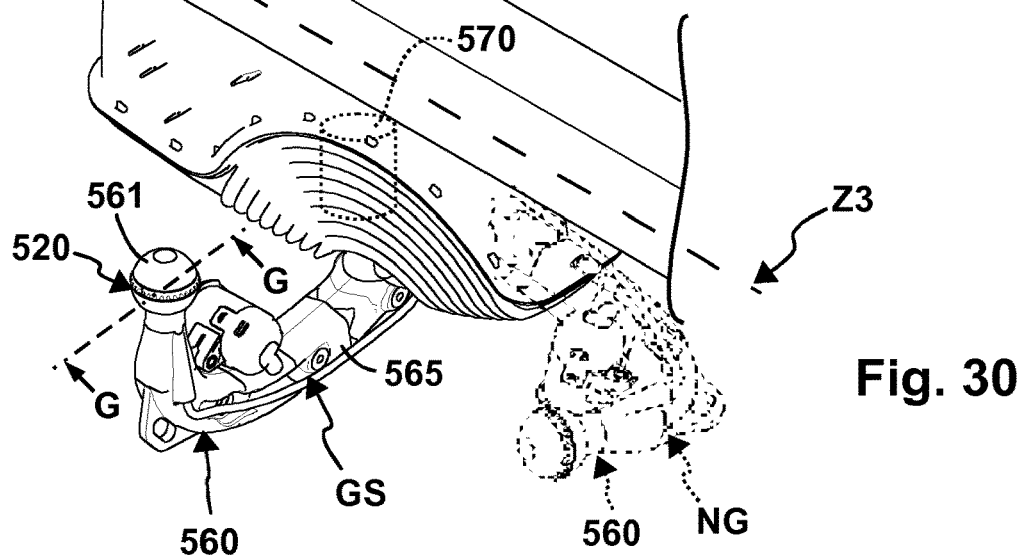

Embodiments of the invention are explained below using the drawings, wherein:

FIG. 1 shows a perspective oblique view of a towing vehicle coupling and a sensor device together with a trailer coupling that can be coupled thereto, FIG. 2 shows a perspective oblique view of the towing vehicle coupling of FIG. 1 from below, FIG. 3 shows a perspective oblique view of the towing vehicle coupling of FIG. 1 obliquely from above, wherein the trailer coupling is coupled to the vehicle coupling, FIG. 4 shows a cross-sectional view through the arrangement of FIG. 2 approximately along a line of intersection SS, FIG. 5 shows a detail D from FIG. 4, FIG. 6 shows a sectional view through a follower of the sensor device shown in FIG. 5, approximately along the line of intersection YY, FIG. 7 shows the arrangement of FIG. 4 in a cross-sectional view during coupling of the trailer coupling to the towing vehicle coupling, FIG. 8 shows the arrangement of FIG. 7, wherein the trailer coupling is pivoted about a joint rotational axis relative to the towing vehicle coupling, FIG. 9 shows a perspective view of another embodiment of a towing vehicle coupling configured as a ball coupling and coupled to a trailer coupling designed as a ball coupling, FIG. 10 shows the arrangement of FIG. 9 from the side, FIG. 11 shows a longitudinal end region of a coupling element of the towing vehicle coupling of FIGS. 9, 10, FIG. 12 shows the towing vehicle coupling and the trailer coupling of FIG. 9 before the coupling of the two components, FIG. 13 shows a side view of the arrangement of FIG. 10 with a detailed representation of a sensor device, FIG. 14 shows the arrangement of FIGS. 9 and 10, wherein the trailer coupling is pivoted relative to the towing vehicle coupling about a joint pivot axis, FIG. 15 shows a schematic representation of the coupling combination according to FIGS. 12-14 with a sensor device shown in more detail, FIG. 16 shows the arrangement of FIG. 15, wherein the trailer coupling is pivoted about a pivot angle relative to the towing vehicle coupling, FIG. 17 shows an exemplary embodiment of a sensor device arranged below a coupling ball and includes a protective housing, FIG. 18 shows an exemplary embodiment of a sensor device, with a bearing body supported by a ball joint, FIG. 19 shows a sensor device in exploded view, which can be arranged on the towing vehicle coupling of FIG. 1 as an alternative to the sensor device of FIG. 1, FIG. 20 shows a side view of the arrangement of FIG. 19 in cooperation with the trailer coupling, FIG. 21 shows a detail D2 from FIG. 19, FIG. 22 shows a partial side view of a follower of the sensor device of FIG. 19, approximately in a viewing direction BR, FIG. 23 shows a perspective view from above of the arrangement of FIG. 20, FIG. 24 shows a section through the towing vehicle coupling of FIG. 20, approximately along a line of intersection RR, FIG. 25 shows a section through a bearing device of the sensor device of FIGS. 19-24, approximately along a line of intersection TT in FIG. 24, FIG. 26 shows a top view of an alternative follower body, FIG. 27 shows a top view of a further alternative follower body, FIG. 28 shows a side view of a further sensor device which, as an alternative to the sensor device of FIG. 1 is arranged on the towing vehicle coupling shown there, FIG. 29 shows a section through the sensor device of FIG. 28, approximately along a line of intersection QQ, FIG. 30 shows a towing vehicle coupling as a ball coupling, approximately according to the exemplary embodiment of FIG. 9, with another sensor device, FIG. 31 shows a section along a line of intersection GG through a coupling element of the towing vehicle coupling of FIG. 30, FIG. 32 shows a follower of the sensor device of the trailer coupling of FIG. 30, of which in FIG. 33 a detail D3 is shown enlarged, FIG. 34 shows a frictional engagement body for fastening to the trailer coupling, for example according to FIG. 18.

In the exemplary embodiments explained below, components are partly similar or identical in their functionality. In that regard, reference numerals are used which are different by 100 or also in some instances identical.

A towing vehicle coupling 60 is configured as a fifth-wheel coupling 60A. The fifth-wheel coupling 60A has a coupling element 61 in the form of what is known as a mounting plate 61A. On the mounting plate 61A, and thus on the coupling element 61, an insertion recess 62 is provided, which can also be referred to as an insertion opening. The insertion recess 62 facilitates the insertion of a coupling counter element 81 of a trailer coupling 80, which has what is known as a pin 82 or a king pin 82. The pin 82 serves to couple the trailer coupling 80 to the towing vehicle coupling 60, wherein the coupled state is shown in FIGS. 2-8.

The towing vehicle coupling 60 is or can be arranged on a towing vehicle Z. The towing vehicle Z is, by way of example, what is known as a semitrailer or another truck.

By contrast, the trailer coupling 80 is or can be fastened to a trailer A, by way of example what is known as a semitrailer.

For coupling the trailer coupling 80 to the towing vehicle coupling 60, the king pin or pin 82 is brought, by way of example, from a rear side of the towing vehicle Z or from an end face 63 of the coupling element 61 to the coupling element 61, wherein in practice the towing vehicle Z moves backwards to couple the semitrailer and thus the trailer vehicle A.

The trailer vehicle A is supported on an upper side 83 of the trailer coupling 80 or the pin 82. The upper side 83 is connected, by way of example, to an underside of the trailer vehicle A, by way of example, welded or screwed.

The upper side 83 is provided on a flange body 84, the underside of which facing away from the upper side 83 forms a support surface 85 for supporting on the towing vehicle coupling 60. The support surface 85 serves to rest on a bearing surface 65 on the upper side 64 of the mounting plate 61A or the coupling element 61. The bearing surface 65 and the support surface 85 are preferably flat surfaces. Therefore, the trailer coupling 80 is supported over a large area on the bearing surface 65 in a horizontal plane, so that substantial supporting forces do not act on the actual king pin 82, which for instance engages with a pin section 91 in a coupling recess 70 of the towing vehicle coupling 60.

On the end face 63 a slide-on slope 66 is arranged, onto which the support surface 85 can slide when coupling the trailer coupling 80 to the towing vehicle coupling 60. The insertion of the king pin 82 into the coupling recess 70 is facilitated by insertion bevels 68, which laterally delimit the insertion recess 62 and extend towards the coupling recess 70 in the direction of a narrowing. The insertion bevels 68 extend from the end face 63 in the direction of a front side 69 of the coupling element 61 or the mounting plate 61A.

The coupling recess 70 has a substantially cylindrical inner contour 71, wherein this inner contour 71 does not have to be completely cylindrical, but merely represents a so-to-speak enveloping inner contour. Thus, the pin section 91 is at least partially supported on the inner periphery of the coupling recess 70 with its likewise essentially cylindrical outer peripheral contour 86 so that the king pin 82 can essentially rotate about a joint rotational axis GZ relative to the towing vehicle coupling 60.

On an underside 74 of the coupling element 61 or the mounting plate 61A, a support body 72 is arranged. The support body 72 is provided next to and/or below the coupling recess 70. The support body 72 may be plate-like. The king pin 82 is to be inserted past the support body 72 into the coupling recess 70 when the trailer coupling 80 is coupled to the towing vehicle coupling 60.

The coupling element 61 is preferably further reinforced on its underside 74 by a rib structure or by ribs 73, making the bearing surface or support surface 65 particularly resilient.

The trailer coupling 80 can be locked on the towing vehicle coupling 60 by a locking device 75 of the towing vehicle coupling 60. The locking device 75 comprises a locking body 76, which engages in a locking recess 87 of the pin 82, which is provided on the outer periphery 86 thereof.

The pin 82 can be easily inserted into the coupling recess 70 in that, by way of example, on its end face 88, i.e. on the side of the pin 82 opposite the flange body 84, a slide bevel 89 is present. The slide bevel 89 is provided, by way of example, by a rounded or conical edge section between the outer periphery 86 and the end face 88 or end surface of the pin 82.

The locking body 76 is expediently driven by a manual or motorised locking drive 77, so that it engages in its locking position into the locking recess 87 and is moved out of the locking recess 87 in its release position, so that the pin 82 can be moved out of the coupling recess 70.

From FIGS. 7 and 8, in particular, it can be seen that the trailer coupling 80 can rotate with respect to the towing vehicle coupling 60 preferably about the joint rotational axis GZ, i.e. about a rotational axis which is generally vertical in driving mode, but also joints rotational axes GX and GY, i.e. about a longitudinal axis and a transverse axis, which extend in particular in the vehicle longitudinal direction of the towing vehicle Z or orthogonally at right angles to the vehicle longitudinal direction of the towing vehicle Z.

When the trailer coupling 80 is coupled to the towing vehicle coupling 60, the coupling counter element 81 can pivot relative to the coupling member 61 with respect to the joint axes GX, GY and GZ, so that the coupling element 61 and the coupling counter element 81 form a joint 95. The coupling counter element 81 and the coupling element 61 are in engagement with each other in a bearing region 96. The bearing region 96 is preferably approximately cylindrical.

By way of example, when cornering, the trailer vehicle A may pivot relative to the towing vehicle Z substantially about the joint axis GZ. However, the trailer vehicle A can also pivot or rotate relative to the towing vehicle Z during a rolling motion or rolling movement about the joint rotational axis GX and/or during a pitching movement about the joint rotational axis GY.

In all these cases, it is possible to determine a pivoting or rotation of the trailer vehicle A relative to the towing vehicle Z about the joint rotational axis GZ, namely by means of a sensor device 10.

The sensor device 10 is accommodated in a receiving space 67 below the coupling recess 70. The receiving space 67 is a receiving space already present in a standard fifth-wheel coupling 60A, meaning that a structural modification is unnecessary.

The sensor device 10 is provided for rotational drive by the coupling counter element 81, which has a follower surface 90 for this purpose. The follower surface 90 is formed by way of example by the end face 88 or provided thereon. However, the slide bevel 89 or any other region of the outer peripheral contour 86 can form the follower surface 90 wholly or partially, as will become clearer.

The sensor device 10 has a follower 20, which can be rotated by the coupling counter element 81, namely the pin or king pin 82, and about a follower rotational axis M.

The follower 20 has a follower surface 21 for producing a follower contact or a follower connection with the pin 82. The follower surface 21 is provided on a free end face of the follower 20. A peripheral wall 22 extends away from the follower surface 21 and, by way of example, runs substantially conically or cylindrically.

The follower surface 21 is provided on an end wall 21A, which is designed essentially as a plane or flat wall. The peripheral wall 22 extends away from the end wall 21A.

Needless to say, an annular follower contour can also be provided on a follower according to the invention. Thus, by way of example, an annular peripheral follower contour 27, in particular a ring, is provided, which may be in engagement with at least a section of the outer periphery 86 of the pin 82. The peripheral follower contour 27 may be partially annular, by way of example, comprising one or more follower projections, which protrude towards the pin 82.

The follower body 20A is preferably elastically deformable in the region of the follower surface 21 and/or the peripheral follower contour 27 and has an elastic section 28 there. By way of example, the follower body 20A at least in the elastic section, comprises an elastically deformable plastic or rubber.

A side of the follower 20, opposite the end wall 21A, is substantially closed by a base wall 23, so that a substantially encapsulated or protective interior space 29A is formed.

The end wall 21A and the peripheral wall 22 form components of a follower body 20A. The follower body 20A is domelike or hood-like and, so to speak, closed at the bottom by the base wall 23.

Thus, the follower body 20A and the base wall 23 substantially encapsulate an interior space 29A. As a result, a protective housing 29 is formed.

The protective housing 29 protects the components arranged in its interior 29A, which are described in detail below.

The sensor device 10 comprises a sensor 11, by way of example a magnetic sensor, which is arranged in the interior space 29A. Signals generated by the sensor 11 are evaluated by an evaluation device 12, which includes, by way of example, a processor 13 and a memory 14. The processor 13 executes program code from at least one program which processes the sensor signals of the sensor 11 and provides them, by way of example, to an interface 15, in particular a bus coupler, for a vehicle electrical system N of the towing vehicle Z. The interface 15 is, by way of example, a CAN bus interface, but may also easily be or include another digital or analogue interface.

The evaluation device 12 is arranged, by way of example, on or in a housing 16. Instead of the housing 16, however, it is also possible to provide a printed circuit board or a similar other electronic component carrier, by way of example the processor 13 or the memory 14 or both.

The evaluation device 12, including the sensor 11, is fully protected in the interior 29A, i.e. within the follower body 20A.

Sensor transmitters 25, by way of example magnets, which are arranged on a sensor carrier 24 serve to excite the sensor 11. The sensor carrier 24 is rotatably mounted on the inside of the peripheral wall 22, i.e. in the interior of the follower body 20A. The sensor carrier 24 has a substantially annular shape. On its inner periphery, opposite the sensor 11, the sensor carrier 24 has sensor element recesses 26 for the sensor transmitters 25.

The sensor transmitters 25 and the sensor element recesses 26 (see FIG. 6) are arranged annularly around the follower rotational axis M of the follower 20 and form a ring assembly 25B. When the follower 20 rotates about the follower rotational axis M, the sensor transmitters 25 are rotated past the sensor 11, whereby a high measuring accuracy can be achieved.

The sensor device 10, in particular the evaluation device 12, is connected to the vehicle electrical system N via a lead arrangement VX connected to the interface 15. Thus, a wired connection of the sensor device 10 to the vehicle electrical system N is created, wherein as in the case of the exemplary embodiment of FIGS. 9 and 10 a wireless connection is also possible, by way of example via infrared, radio or similar.

The follower 20 is rotatably mounted about the follower rotational axis M on a bearing body 30. The bearing body 30 is designed, by way of example, as a bearing shaft or bearing axis. At its end region opposite the end wall 21A, the bearing body 30 has a flange projection 31, on which a pivot bearing 33 is held. In the region of the base wall 23, a further pivot bearing 34 is provided, which is supported on the bearing body 30 by means of a support body 39. The pivot bearings 33, 34 are preferably rolling bearings, in particular ball bearings, ball bearings or similar, which is why the follower 20 rotates easily about the follower rotational axis M.

However, the bearing body 30 is held in a manner that prevents it from rotating relative to the follower rotational axis M by means of an anti-rotation lock 35 on a holding device 40 which is provided for holding the sensor device 10 on the towing vehicle coupling 60. The holding device 40 has a holding plate 41 on which the bearing body 30 is supported or from which the bearing body 30 protrudes. The holding plate 41 forms a carrier 47 for the bearing body 30.

By way of example, the anti-rotation lock 35 comprises a screw 36 which is screwed into a screw recess 36A. The screw 36 penetrates a screw opening on the holding plate 41, which is eccentric to the follower rotational axis or central axis of the bearing body 30.

The bearing body 30 has an elongated shape extending along the follower rotational axis. Between the pivot bearings 33, 34 a spacing is provided, in which the sensor 11 is arranged. The spaced apart or mutually spaced pivot bearings 33, 34 provide optimum support for the follower 20 on the bearing body 30 relative to the follower rotational axis M, so that the follower 20 is optimally supported transversely to the follower rotational axis M.

The bearing body 30 also has a receiving space 30A for the sensor 11 and the evaluation device 12. A channel 37 for the leads of the lead arrangement VX extends from the receiving space A terminating at the holding plate 41. There, a passage opening 46 is provided for the lead arrangement VX through which the leads of the lead arrangement VX are guided.

The lead arrangement VX comprises, by way of example, a data connection DV, which comprises one or more bus lines. Furthermore, supply connections V1, V2, by way of example, a low DC voltage of 5-10 volts and ground, are components of the lead arrangement VX.

The follower 20 is movably mounted relative to the coupling element 61, in particular the coupling recess 70, so that in particular during coupling of the trailer coupling 80 to the towing vehicle coupling 60, it participates, so to speak, in various movements of the carrier rotational axis M. Thus, by way of example, the slide bevel 89 deflects the follower 20 from its position shown in FIGS. 4 and 5, in which the follower rotational axis M is, so to speak, aligned or parallel to the joint rotational axis GZ, so that the follower 20 can be deflected from its central position by rotational degrees of freedom DX and DY and/or linear degrees of freedom LX, LY and LZ. The pivoting degrees of freedom or rotational degrees of freedom DX, DY are orthogonal to the follower rotational axis M and orthogonal to each other. By way of example, the follower 20 may pivot with the degree of freedom of rotation DX about an axis SX which is parallel to the joint rotational axis GX. During deflection or displacement with the linear degree of freedom of movement LX, the follower 20 can be deflected linearly about the axis SX parallel to the joint rotational axis GX, i.e. moved at right angles to the follower rotational axis M.

The further linear degree of freedom of movement LY permits a deflection or displacement of the follower 20 transversely to the degree of freedom of movement LX or to the X axis and/or along an axis SY which is parallel to the rotational axis GY. When rotated by the degree of freedom of rotation DY the follower 20 rotates about this axis SY parallel to the joint rotational axis GY.

The displaceability with the degree of freedom LZ is provided parallel or coaxially to the follower rotational axis M, e.g. about an axis SZ.

All of the aforementioned degrees of freedom of rotation DX, DY or linear degrees of freedom of movement LX, LY or LZ make it possible for the follower 20 to be deflected out of its central position when the trailer coupling 80 is coupled to the towing vehicle coupling 60, by way of example, so that its end wall 21A on the end face 88 or the support surface or follower surface of the pin 82 comes to rest flat and parallel. This can be seen in particular in FIGS. 7 and 8. In addition, the rotational follower coupling of the follower 20 is also possible with a deflection transverse to the follower rotational axis M, see in particular FIG. 8. Thus, by way of example, the follower 20 pivots by the degree of freedom of rotation DX or DY in the representation of FIG. 8, but still remains in follower contact with the pin 82.

In a transition region or edge region between the end wall 21A and the peripheral wall 22, an inclined surface 22A or insertion bevel is preferably provided onto which the coupling counter element 81 can slide when coupling to the coupling element 61, i.e. when inserted into the coupling recess 70, for example. In this case, the coupling element 61 can, by way of example, tilt or pivot the follower 20 transversely to the follower rotational axis M and/or adjust it along the follower rotational axis M.

The mobility of the follower 20 by the degrees of freedom of movement DX, DY, LX, LY and LZ is provided by the holding device 40, on which the bearing body 30 is arranged in a fixed, i.e. immovable, manner.

The holding plate 41 is fixed to the underside 74 of the mounting plate 61A. Thus, by way of example, the retaining projections 42 of the holding plate 41 protrude from a main body of the same and/or are provided on the corner regions of the holding plate 41. The holding projections 41 have passage openings 43 for screws 44, which are screwed into the coupling element 61 and/or the support body 72 from the underside 74 thereof.

Instead of the screws 44, however, by way of example what are known as welding bolts may be provided, the longitudinal end sections of which are welded to the coupling element 61, advantageously based on what is referred to as capacitor welding or resistance welding.

Between heads 44A of the screws 44 and the holding plate 41, springs 52 of a spring arrangement 51 are provided, which are supported on the one hand on the heads 44A, and on the other hand on the holding plate 41, and thus on the bearing body 40. In this way, the springs 52 act as a force-applying means 50 such that they push the follower 20 in the direction of the pin 82, so that its end wall 21A is pressed against the end face 88 of the pin 82.

The bearing body 30, and therefore the bearing shaft or bearing axis, is arranged in a receiving recess 45 of the holding device 40 or the holding plate 41 and protrudes in the direction of the coupling recess 70 and thus in the state when the trailer coupling 80 is coupled to the towing vehicle coupling 60 towards the pin 82.

An additional force in the direction of a follower coupling is provided by a magnet 53 which is arranged between the bearing body 30 and the end wall 21A of the follower 20. The magnet 53 acts with its magnetic attraction in the direction of the pin 82. By way of example, the magnet 53 is sandwiched between an end face 38 of the flange or flange projection 31 of the bearing body 30 and the end wall 21A.

However, the magnet 53 could cause a disturbance of the sensor 11, by way of example, superimposing on or interfering with the magnetic fields of the magnetic sensor body 25. To avoid this unfavourable situation, a screen 54 is provided, which is arranged between the magnetic sensor transmitters 25 and the magnet 53. By way of example, the screen 54 consists of or has a flux guide plate. The screen 54 is preferably sandwiched between the end face 38 of the bearing body 30 and the magnet 53. A side of the magnet 53 facing the sensor transmitters 25 is preferably completely screened by the screen 54, which is by way of example plate-like.

The screen 54 may also screen the magnet 53 peripherally, by way of example, with a screening wall 54A, which can protrude from the plate-like or wall-like screen 54 and be integral therewith.

A multiaxis pivotability with a joint 195 is also provided in a coupling of a trailer coupling 180 to a towing vehicle coupling 160.

The towing vehicle coupling 160 has a ball head 162 as a coupling element 161. The ball head 162 is arranged on a free end region of a coupling arm 165, which is fastened or detachably fastened to the rear of a towing vehicle Z2, by way of example a passenger car. The coupling arm 165 has, by way of example, a mounting section 166, in particular a plugin section for attachment to the towing vehicle Z2. By way of example, a vehicle mount 170 is arranged on the towing vehicle Z2. The vehicle mount 170 includes a receiving body 171, which is in particular releasably attached to a cross member or other support structure at the rear of the towing vehicle Z2. A plugin recess 172 is present on the receiving body 171 for insertion of the mounting section 166. Forming contours 167, by way of example, wedge slopes or similar other form-fit contours, are provided on a foot region of the mounting section 166 for the positivelocking engagement in positive-locking counter contours 174 on the receiving body 171. The coupling arm 165 is further retained on the vehicle mount 170 by means of a locking device 175. The locking device 175 comprises, by way of example, a locking body 176, in particular balls, bolts or similar, which can be actuated by an actuating body 177, wherein, in the case of suitable actuation in a locking recess, in particular a groove on the inner periphery of the plugin recess 172 they are actuated in a locking engagement. The actuating body 177 is boltlike and operable in the longitudinal direction of the mounting section 166, which is indicated by a double arrow. For actuating the actuating body 176, a motor drive or as in the present case, a manual drive 178 can be provided, which can be driven by a manual actuating element 179, in particular a handwheel. When the manual operating element 179 is rotated, by way of example engages a pinion in a tooth system on the actuating body 177 to adjust this in its longitudinal direction, whereby the locking bodies 176 are actuated through unspecified passage openings on the mounting section 166 radially outward from the same in order to engage in the interlock recess 173.

Such a locking technique is known. As an alternative to a plugin mount, however, a fixed attachment of the coupling arm 176 to the towing vehicle Z2 may also be provided, or also supporting by means of a schematically illustrated bearing 270, on which the coupling arm 165 by way of example protrudes between a use position, in which it protrudes from the rear, in particular a bumper, of the towing vehicle Z2, and a nonuse position in which it is at least substantially hidden behind and/or under a rear contour of the towing vehicle Z2, by way of example behind a bumper of the towing vehicle Z2. By way of example, the coupling arm 165 can pivot about a pivot axis SA of the bearing 270.

The trailer coupling 180 is configured as a ball coupling. As a coupling element 181, there is a coupling recess 182 into which the ball head 162 and therefore the coupling element 161 in the sense of a ball joint can engage in a manner known per se. The ball head 162 is mounted in the coupling recess 182 so that the two bodies in a bearing region 196 are in engagement with each other.

The coupling counter element 181 can pivot on the coupling element 161 about the joint rotational axes GZ, GX and GY, wherein the joint rotational axis GZ is a substantially vertical axis in driving mode, while the other two joint rotational axes GX and GY in the longitudinal direction of the towing vehicle Z2 and in the transverse direction in each case run horizontally. However, these coordinates or alignment of the rotational axes can also be designed differently.

The trailer coupling 180 includes, by way of example, a drawbar or is arranged with a mounting section 183 on a drawbar.

A locking device 185 serves to lock the trailer coupling 180 to the towing vehicle coupling 160. The locking device 185 comprises a locking element 187, by way of example a clamping jaw or closing jaw, which is adjustable on a swivel bearing 184 between an open position OP and a closed position LO, wherein the coupling element 161 can be removed from the coupling counter element 181 in the open position, but not in the closed position LO. A manual actuating element 186, serves for actuating the locking element 187 by way of example with a handle.

As with the coupling of the trailer coupling to the towing vehicle coupling 160, in the case of the trailer coupling 180 in connection with the towing vehicle coupling 160 a pivoting movement of the trailer coupling 180 relative to the towing vehicle coupling 160 about the joint rotational axis GZ is to be detected for which a sensor device 110 is provided.

The sensor device 110 can be retrofitted to the towing vehicle coupling 160 without having to modify in any way the elements which are to be coupled to one another, namely the coupling element 161 and optionally the coupling counter element 181. In particular, the towing vehicle coupling 160 must not to be altered in the region of a cylindrical section 163, in particular of a shaft, with which the coupling element 161 is held on the coupling arm 165, in particular its upper arm section 164. In this case it is provided that the sensor device 110 is attached to the end section of the coupling arm 165, in particular on the arm section 164 close to the cylindrical section 163, so that a follower 120 of the sensor device 110 can come into follower contact with the trailer coupling 180.

In this case the follower 120 is carried along in rotation on the end face of the coupling element 181, in particular an edge region of the coupling receptacle 182, so that it rotates together with the coupling counter element 181, when this is rotated about the joint rotational axis GZ, by way of example during cornering by a pairing comprising the towing vehicle Z2 and the trailer A2, on which the trailer coupling 180 is arranged.

However, the trailer coupling 180 can pivot not only about the joint rotational axis GZ, which is indeed easily through by the follower 120 and possible through an arrangement of the follower 120 as, by way of example, described in document EP 2 415 620 A1, but also about the joint rotational axes GX and GY. To solve this problem, what is known as a floating or multi-joint bearing of the follower 120 with respect to the coupling element 161, in particular with respect to the coupling arm 165, is provided.

The follower 120 has a follower surface 121 associated with and/or facing the end face 188 of the coupling recess 182, which is in particular annular. The follower 120 has a follower body 122, on which the follower surface 121 is provided on its end face. A side of the follower body 122 or the follower 120 facing away from the follower surface 121 is configured as a bearing section 123 which is rotatably mounted on a bearing body 130 and additionally rotatable through degrees of freedom of rotation DX and DY. The rotational degrees of freedom DX and DY are provided about rotational axes that are parallel to the joint rotational axes GX and GY. Furthermore, it is possible or conceivable for the follower 120 to have a linear displaceability relative to the bearing body 130, by way of example about axes which are parallel to the joint rotational axes GZ, GX and GY. For example, a linear degree of freedom of movement LZ can be provided parallel to the follower rotational axis M.

The follower 120 is rotatably mounted on the bearing body 130 about the follower rotational axis M and pivotable transversely to the follower rotational axis M, namely with the degrees of freedom of rotation DX and DY. Thus, the follower 120 can participate in pivoting movements of the trailer coupling 180 about the joint rotational axes GX and GY, without the follower contact or the coupling between see the follower 120 and the coupling counter 181 being interrupted.

The bearing body 130 is annular. The bearing body 130 is fastened, by way of example, to the arm section 164, by way of example with a screw 141 of a holding device 140. The clamping screw 141 runs, by way of example, radially to the arm section 164 and clamps the bearing body 130 with the coupling arm 165.

Between the follower 120 and the bearing body 130 force-applying means 150 are provided, by way of example with a spring arrangement 151. The spring arrangement 151 includes one or more springs 152 which are supported on the bearing body 130 and the follower body 122 or follower 120. By way of example, the springs 152 are supported on an edge or support section 124 of the follower body 122. The support section 124, by way of example, a step, a recess or similar, is arranged between the bearing section 123 and the follower surface 121.

A further application of force to the follower 120 in the direction of the trailer coupling 180 is carried out, by way of example, by a magnet 153 which is arranged on the carrier 120. The magnet 153 (there may also be a plurality of magnets, in particular arranged on the outer periphery of the follower 120) impinges on the follower 120 with a magnetic force in the direction of the end face 188 or in the direction of the coupling counter element 181.

The process of coupling the trailer coupling 180 to the towing vehicle coupling 160 is illustrated in FIGS. 12 and 13. It can be seen that the coupling counter element 181 comes into follower contact with the follower 120 when coupling to the towing vehicle coupling 160, i.e. that, by way of example, the spring arrangement 151 is compressed when the coupling socket or the coupling recess 182 is placed on the ball head 162.

Then, when the coupling counter element 181 of the trailer coupling 180 rotates about the follower rotational axis M, it takes the follower 120 with it, so that the sensor arrangement 110 by means of the sensor or the sensors 111 is able to detect a respective rotation angle position of the follower 120 relative to the bearing body 130 and thus relative to the towing vehicle Z2 or the towing vehicle coupling 160.

On the follower 120 sensor transmitters 125, in particular magnets, are arranged, in particular a ring arrangement with a plurality of sensor transmitters or magnets 125 arranged around the outer periphery of the coupling arm 165, the position of each of which is detectable by at least one sensor 111 or a plurality, by way of example, two sensors 111a and 111b.

The sensors 111 therefore detect the magnetic field of the sensor transmitter 125 and thus the angular position of the coupling counter element 181 to the coupling element 161.

The evaluation device 112 has an interface 115, in particular a radio module or other wireless interface, for communication with the vehicle electrical system N. On the towing vehicle Z2, in particular in the region of the vehicle mount 170, a receiver 116, which forms a component of the sensor device 110 or forms a system together with the sensor device 110, is arranged for receiving sensor signals which represent the rotation angle position of the trailer coupling 180 relative to the towing vehicle coupling 160 about the follower rotational axis M. The receiver 116 may have, by way of example, a bus interface and/or a power supply interface or similar for coupling and/or connection to the vehicle electrical system N of the towing vehicle Z2.

By way of example, a battery (not shown), a rechargeable battery or similar may be present for the local power supply of the sensor device 110. A power supply based on a photocell or other device suitable for electrical energy production is perfectly conceivable.

In the exemplary embodiment according to FIG. 17, a sensor device 210 is shown which has similar components to the sensor device 110 already explained. However, a follower 220 of the sensor device 210 is configured at least as a cover, preferably as a protective housing 229, for the at least one sensor 111 and preferably also the bearing body 130.

A follower body 222 corresponds in principle to the follower body 122, but does not engage in an interior of the bearing body 130, but has a cover section 221, in which the bearing body 130 is at least partially included. The follower body 222 may optionally be closed at a side facing away from the follower surface 121 by a cover 223, which is preferably annular and may have a passage opening 225 for the coupling arm 165, in particular its cylindrical section 163 and the upper region of the arm section 164. At the passage opening 225, a seal, in particular a sealing ring, or a seal with, by way of example, silicone or other joint sealant, may be provided. The cover 223 is connected on its end face to the follower body 222, by way of example glued, welded or similar. The cover 223 and the follower body 222 together form a protective housing 229 for the at least one sensor 111 and preferably the bearing body 130.

Needless to say, the exemplary embodiment with a protective housing described in connection with FIG. 17, is also quite possible with the exemplary embodiment of FIGS. 10-16, by way of example in that a corresponding cover hood or similar is arranged on the follower 120. A protective housing is also possible in principle in the exemplary embodiment explained below according to FIG. 18, but is omitted in the interests of clarity.

A sensor device 310 is provided for arrangement on the towing vehicle coupling 160. For this purpose, it has a holding device 340, by way of example a retaining ring 342, which is fastened to the cylindrical section 163 and/or arm section 164 of the towing vehicle coupling 160, by way of example, clamped, glued or similar. A corresponding clamping screw is not shown in the drawing in the interests of simplicity. The holding device 340 has a bearing recess 341 for a bearing section 331 of a bearing body 330. The bearing section 331 and the bearing recess 341 are, by way of example, sections of a ball joint bearing, and therefore have, by way of example, spherical segments or are configured to be spherical segment-like. Thus, the bearing recess 341 is configured, by way of example, in the manner of a receiving shell. Thus, the bearing body 330 can pivot relative to the retaining ring 342 in a ball joint, so that a follower 320 rotatably mounted on the bearing body 330 about the follower rotational axis M can also, so to speak, join in the movements of the trailer coupling 180 about the joint rotational axes GX, GY so that its follower surface 321 remains in follower contact with the end face 188 of the trailer coupling 180.

The follower 320 is mounted on the bearing body 330 by means of a roller bearing 333, in particular a ball bearing or rolling bearing so that it can rotate about the follower rotational axis M. The rolling bearing 333 preferably has low friction, so that the trailer coupling 180 is able to take the follower 320 with it or rotate with particular ease.

The sensor 111 is arranged on the bearing body 330, so that sensor transmitters 25, in particular magnets, on the follower 320, which are arranged in an interior of the bearing body 330, rotate about the follower rotational axis M, but do not pivot transversely thereto or otherwise change their position. As a result, an optimal signal detection by the sensor 111 is readily achievable. The sensor transmitters 25 are arranged, by way of example, on a bearing section 323 of the bearing body 320, on which the rolling bearing 333 is supported.

A spring arrangement serves as a force application means 350 with springs 352, which are arranged between the bearing body 330 and the holding means 340 and thus not only the bearing body 330, but also the follower 320 mounted on the bearing body 330 so that it can rotate about the follower rotational axis M, impinge in the direction of the coupling counter element 181. As a force-applying means 350, alternatively or in addition to the springs 352, a magnet or a magnet arrangement 353 may be provided which is arranged on the follower 320 and impinges on it with magnetic force in the direction of the coupling counter element 181.

The sensor device 110 comprises an evaluation device 112, which is arranged, by way of example, on or in the bearing body 130 (FIG. 10). The evaluation device 112 includes, by way of example, a processor 13 and a memory 14, in which one or more program modules may be stored, whose program code is provided by the processor 13 for evaluating the sensor signal of the sensor 111 or the sensors 111a, 111b.

It should be mentioned at this point, however, that the magnetic measuring principles or sensor principles of the sensor device 10, 110 are not the only embodiment. In a sensor device according to the invention, by way of example, inductive, capacitive or optical sensors, also in combination, may be provided. By way of example, instead of the sensor transmitters 25, 125 designed as magnets, optical markings, in particular lines or similar, can be provided, which can be detected by an optical sensor 11, 111. Capacitive detection is also readily possible if, by way of example, corresponding electric fields are provided by the sensor transmitters.

Instead of sensor transmitters 25, 125, other sensor elements or sensors may also be provided. Thus, the sensory detection of a relative position of a follower relative to a carrier or bearing body can also be performed by at least one sensor, which is arranged on the follower and thus rotates relative to the bearing body or carrier about the follower rotational axis.

The followers 120, 220, 320 may be wholly or partly made of an elastic material, by way of example a flexible plastic, rubber or similar. An elastic resilience in the region of the follower surface 21 is particularly advantageous.

In the case of the sensor device 210, 310, the evaluation device 112 already described can be provided for the respective sensor 111.

Like the sensor device 10, a sensor device 610 is suitable for accompanying the coupling counter element 81 of the trailer coupling 80 about the follower rotational axis M.

The sensor device 610 comprises a holding device 640, which like the holding device 40 can be secured to the support body 72 of the towing vehicle coupling 60.

The holding device 640 has a holding plate 641, on which a holding section 645 is provided for fastening a bearing body 630. Fastening parts 645A, 645B extend from the holding section 645 and have, by way of example, a stepped design. By way of example, the parts 645, 645A and 645B extend in a stepped arrangement to each other. On the fastening parts 645A, 645B, retaining projections 642 are provided which, for example, are suitable for a screw connection with the support body 72 of the towing vehicle coupling 60 by means of, by way of example, the screws 44.

The bearing body 630 serves to mount the follower 620 about the follower rotational axis M. By way of example, an upper pivot bearing 33 is arranged on an end region of the bearing body 630 facing away from the holding plate 641, in particular on a flange projection 31. Spaced apart from the bearing 33, with respect to the follower rotational axis M a further bearing 34 is provided. The bearings 33, 34 form a bearing arrangement 32 which supports the follower 20 rotatably about the follower rotational axis M relative to the bearing body 630. The pivot bearing 34 is arranged on a support body 39, which in turn is supported on the bearing body 630.

The follower 620 is similar to the follower 20 insofar as it has a peripheral wall 622 and an end wall 621A and, by way of example, is substantially cylindrical or conical, in particular mushroom-shaped. The end wall 621A is provided for rotational drive by the coupling counter element 81.

The follower 620 forms a protective housing 29 with a protected interior space 29A, in which the electronic components of the sensor device 610 are arranged, in particular the sensor 11 already described. This is located in the interior of the sensor carrier 24, on which at least one sensor transmitter 25, by way of example a magnet, is arranged for actuating the sensor 11.

The bearing body 630 has a channel 637, which communicates with a passage opening 646 of the holding plate 641, so that a lead arrangement VX can be run to the evaluation device 12 and the sensor 11 through these two components.

On the end wall 621A, a magnet 653 in the manner of the magnet 53 is arranged. The magnet 653 is arranged in a screen 654 having, by way of example, a base wall 654A and a peripheral wall 654B. The base wall 654A is penetrated at right angles by the follower rotational axis, while the peripheral wall 654B extends about the follower rotational axis M. Therefore, the sensor 11 is screened from the magnet 653 and cannot influence this.

With the sensor device 610, mobility of the holding device 640 relative to the support body 72 or the towing vehicle coupling 60 is also achieved similarly to the sensor device 10. Instead of the screws 44, however, bearing bodies 644 are provided which penetrate the passage openings 643 of the holding device 640 on the holding projections 642 and are connected with attachment sections 644C to the towing vehicle coupling 60, in particular the support body 72, by way of example by screwing, gluing or welding. By way of example, screw threads may be provided on the attachment sections 644C. The bearing bodies 644 advantageously have a boltlike design.

The bearing bodies 644 form components of bearing devices 655, which support the holding device 640 so that it can pivot and displace relative to the support body 72. In fact, the bearing devices 655 each comprise a swivel bearing 656, in particular a multiaxis swivel bearing, namely a ball bearing and a sliding bearing 657. By way of example, bearing bodies 658 are accommodated in the passage openings 643, which can also be referred to as bearing recesses. On the bearing bodies 658 bearing recesses 656A of the swivel bearing 656 are provided. In the bearing recesses 656A, a bearing body 659 is received in the manner of a ball or partial ball. The bearing body 656 can pivot multi-axially in the bearing recess 656A, by way of example about the axes SX and/or SY or in each case axes parallel thereto.

In the bearing body 659 a bearing recess 657A, namely a sliding bearing recess, is provided for the bearing body 644. The bearing body 644 is therefore longitudinally displaceable in the bearing recess 657A along a displacement axis ZZ, which is indicated by a double arrow PZ. The pivotability of the bearing body 644 relative to the bearing recesses 655A or the pivotability of the bearing body 658 about the bearing body 659, so that the holding device 640 can pivot relative to the bearing body 644, is indicated by dashed lines. So, therefore, the holding device 640, in particular the holding plate 641, can be displaced both axially about the axis direction PZ with respect to the respective bearing body 644, and also pivoted about mutually angular pivot axes, which at the point of intersection of the central longitudinal axis of the bearing body 644 and the centre plane of the holding plate 641 are located in the region of the respective retaining projection 642.

The drawing shows how the retaining plate 641 can be deflected due to the mobility on the rotary bearings 656 and sliding bearings 657. However, the deflection shown in the drawing has been exaggerated. In practice, a slight deflection of, for example, a few degrees is sufficient to enable the coupling counter element 81 to deflect or to facilitate a deflection of the follower 620 from its middle position for sliding on the end wall 621A.

To improve the mobility of the holding plate 641 relative to the fixed components of the towing vehicle coupling 60, for example of the support body 72, it is advantageously provided that the bearing bodies 658 are received in the passage openings 643 with a movement play transversally to the displacement axis ZZ or longitudinal axis of the sliding bearing 657. By way of example, a bearing region 643A of the holding plate 641 protrudes in the region of the respective passage opening 643 into a bearing receptacle 658A, by way of example a bearing groove, on the bearing body 658. By way of example, the bearing region 643A may be circular, but may comprise other contours, such as a slot. Accordingly, by way of example, an oval or elongated bearing region 643B may be provided, which is indicated schematically. The bearing recess 658A may be, by way of example, a peripheral groove on the bearing body 658. Thus, the bearing body 658 is transversely movably received in the passage opening 643 transversely to the direction of movement, which is indicated by the double arrow PZ. In this way, tensions can be advantageously avoided.

Alternatively or additionally, it would also be possible, by way of example, to connect the bearing body 658 to the holding plate 641 by means of an elastomer, so that the bearing body 658 is accommodated, as it were, floating in the holding plate 641.

The holding plate 641 is also subjected to force relative to the bearing bodies 644, namely by a force-applying means 650. The force-applying means 650 comprises a spring arrangement 651 with springs 652. The springs 652 are respectively supported on a head 644A of a bearing body 644 on the one hand and on the other hand on a component that is stationary or immovable relative to the holding plate 641 or the holding device 640, by way of example, one of the bearing body 658 or 659. The springs 652 are penetrated by a bearing section 644B of a respective bearing body 644. The bearing section 644B is longitudinally slidably received in the bearing recess 657A.

The follower 620 is constructed in several parts. It has a follower carrier 667, the basic contour of which is similar to the follower 20 namely having a front wall 668 and the peripheral wall 622. The follower carrier forms the protective housing for, inter alia, the sensor 11 and the evaluation device 12 and is rotatably supported by the bearing arrangement 32 on the bearing body 630.

On the follower carrier 667 a follower body 660 is releasably secured, by way of example glued, screwed or similar. The follower body 660 forms, so to speak, the wear part, which is easily replaceable, while the follower carrier 667 remains permanently on the bearing body 630.

By way of example, a underside 666 of the follower body 660 is glued to the end wall 668 and/or lies flat on this. For releasable attachment, by way of example, a screw arrangement with screws 665 may be provided, which penetrate a main body 661 of the follower body 660 at passage openings 664 and are screwed into screw recesses 669 of the carrier 667.

Centrally with respect to the follower rotational axis M, the follower body 660 has a receptacle 663 for the magnet 653. By way of example, the screen 654 is accommodated in the recess 663. At the radial outer periphery of the recess 663, a plurality of recesses 662 extend which, by way of example, ensure that the follower body 660 is more easily compressible at its edge region, which can facilitate a sliding of the coupling counter element 81 on the follower 620. In particular, the edge region of the follower body 660 extending around the recesses 662 has an obliquely flat slope and has the bevel 622A. However, the recesses 662 can also serve to ensure that the follower body 660 is particularly light or that little material is necessary for it. However, the recesses 662 can also serve to ensure that the follower body 660 is dimensionally stable.

The magnet 663 and/or the screen 654 may be glued, inserted or screwed into the material of the receiving body 660. However, it is also possible to over-mould the magnet 653 and/or the screen 654 with the material of the follower body 660.

The end wall 621A or end face of the follower 620 is configured as a frictional engagement surface 681 and serves for the frictional follower contact of the follower 620 with the coupling counter element 81. It would then be possible to provide the frictional engagement surface 681 directly at a free end face or flat side 653A of the magnet 653 protruding from the receiver 663, by way of example in that the particles 683, which are explained below, are firmly connected to this free end face 653A on the basis of a bond or other lamination.

In the present case, however, a separate frictional engagement body 680 is provided. The frictional engagement body 680 is, by way of example, plate-like or foil-like and fixedly arranged on the free end face 653A of the magnet 653, by way of example adhesively bonded. However, the frictional engagement body 680 can also be formed by a material of the follower body 660 which encloses the magnet 653 and in which the particles 683 are directly embedded.

On its side remote from the magnet 653 the frictional engagement body 680 has the frictional engagement surface 681. The particles 683 protrude from a support surface 682 of the frictional engagement body 680. By way of example, frictional engagement body 680 is adhesively bonded to the end face 653A of the magnet 653 on the basis of an adhesive layer 686.

The frictionally engagement body 680 has a main body or a base layer 685, which has the adhesive layer 686 on opposite sides on the one hand, and a support layer 684 for the particles 683 on the other hand. The support layer 684, which may also be referred to as a bonding layer or adhesive layer, carries the particles 683. These are, as it were, embedded in the support layer 684 and protrude freely therefrom.

The particles 683 protrude from the support surface 682, by way of example in the manner of pyramids. Thus, their tips 687, by way of example pyramid apexes, protrude in a spine-like manner from the support surface 682, so that they can penetrate in a spine-like manner into the end face 88 of the coupling counter element 81, i.e. the follower surface or frictional engagement surface of the coupling counter element 81. From the tips 687 the side surfaces of the particles 683 extend toward the support surface 682, whereby edges 688 are formed between the respective side surfaces.

A central surface 690 of the frictional engagement surface 681 does not have particles 683. There, the support surface 682 is exposed. The central surface 690 is penetrated by the follower rotational axis M. From the central surface 690 or the follower rotational axis M, the particles 683 run in rays 689, i.e. they are regularly arranged. The tips 687 and the free end regions of the particles 683 protrude approximately equidistantly from the support surface 682. Thus, the tips 687 do not "puncture" an envelope 691. The envelope 691 is a flat surface or even surface corresponding to the flat or even surface of the end face 88 of the coupling counter element 81.

The mere radial arrangement of the particles 683 on the support surface 682 results in a higher concentration of particles 683 near the central surface 690 than at the radial outer edge region of the frictional engagement body 680 or the friction engagement surface 681. So, by way of example, grease or similar other soiling is forced into the wide spaces between the mandrel-like particles 683, so that their tips 687 protrude from the layer of soiling or layer of grease not shown in the drawing and produce the frictional engagement with the coupling counter element 81.

The particles 683 are arranged annularly or circularly around the follower rotational axis M. Of course, a chaotic arrangement or also an arrangement with different distributions or areas would also be possible. In addition, the angular spacing between the particles 683 may be smaller at the radially outer periphery than near the central surface 690, unlike in the drawing.

The particles 683 are preferably corundum, quartz, rock particles or similar other hard material with sharp edges and in any event with tips.

The support layer 684 contains, by way of example, glue and/or epoxy resin in order to adhere or bond the particles 683 to the base layer 685. The support layer 684 and/or the base layer 685 and/or the adhesive layer 686 can be elastic components and/or consist of an elastic material or contain an elastic material.

For better retention of particles on a frictional engagement surface or support surface a cover layer 692, by way of example, a wax or similar may also be provided. It is advantageous, however, if at least some of the edges 688, but in any case the pyramid apexes or tips 687, of the particles 683 protrude from the cover layer 692. The cover layer 692 expediently consists of a softer material than the particles 683, so that they can create the contact with the coupling counter element 81.

The distribution and/or arrangement of particles on a frictional engagement surface may also be configured differently than in the aforementioned embodiment, which should be more noticeable due to frictional engagement bodies 780, 880. These substantially correspond to the frictional engagement body 680, i.e. by way of example in that a support layer, a base layer and an adhesive layer are present.

However, the particles 683 of the frictional engagement surfaces 781, 881 of the frictional engagement bodies 780, 880 could also be provided directly on the follower body 660 or the magnets 653.

The particles 683 are arranged on the frictional engagement body 780, by way of example, in rings 793, 794, 795, which run concentrically around a centre of the circular frictional engagement body 780. Between the rings 793–795, the support surface 782 is exposed and it is in this that the particles 683 are embedded in the rings 793, 794, 795. The centre 790 or the central surface 790 of the frictional engagement body 780 is also devoid of particles 683, so that there the support surface 782 is exposed for direct frictional engagement of the coupling counter element 81.

In the frictional engagement body 880, the particles 683 are arranged in angle segments 893 which, by way of example, radiate around the follower rotational axis M. Between the angle segments 893, where the particles 83 of the frictional engagement surface 881 of the frictional engagement body 880 are located, angle segments of the support surface 882 are likewise exposed, thus having no particles.

This principle of improved frictional engagement by means of the particles can also be implemented easily in the case of a coupling counter element which interacts with a follower which has particles for frictional engagement with the coupling counter element or interacts with such a follower on which no such particles are provided.

For example, particles 683 can be provided on the coupling counter element 81. For example, these particles can be provided by one of the frictional engagement bodies 680, 780 or 880, which is secured to the end face 88 or the follower surface 90, for example, and forms a counter follower element 990.

The frictional engagement body 680, 780 or 880 can, for example, be materially bonded to the end face 88 or the follower surface 90 and/or glued thereto. However, it is also possible for the frictional engagement body 680, 780 or 880 to be materially bonded to the end face 88 or the follower surface 90, e.g. screwed, riveted, pinned or similar.

However, it is also possible, for example, for the end face 90 to integrally have particles 683, for example, by scattering particles 683 into the hot base material of the end face 88 of the coupling counter element 81 and/or in which a layer, in particular an adhesive layer, in arranged on the end face 88, for example a layer of rubber, elastic, plastic or the like, which particles 683 are embedded.

A sensor device 410 has, as it were, a central bearing for a follower 420, which substantially resembles the follower 620. The follower 420 therefore also has a follower body 460 intended for the actual frictional engagement or following contact with the coupling counter element 81, which resembles the follower body 660, and a follower carrier 467 which carries the follower body 460 in the same way as the follower carrier 667.

The same and similar components, including the magnet 653, thus have the same reference numerals, which have already been explained. Accordingly, the follower carrier 467 is supported on the bearing body 430 by means of the pivot bearings 33, 34, which have a longitudinal spacing relative to the follower rotational axis M, which also has a support body 39 for supporting the lower pivot bearing 34 in the drawing, which is penetrated by the bearing body 430. Instead of the support body 39 a flange projection or similar can of course also be provided, which protrudes radially from the bearing body 430.

The protective housing, which is formed by the follower carrier 667, is covered by a base wall 23, which is penetrated by the bearing body 430.

The bearing body 430 is supported on a holding device 440 which is connected to the support body 72, namely by means of screws 444 which are screwed into the support body 72 and whose heads 444A are supported on a holding plate 441 of the holding device 440. The holding plate 441 is stationary relative to the towing vehicle coupling 60, in particular its support body 72. The mobility of the carrier 420 is ensured by a bearing device 455, with which the bearing body 430 is movably mounted on the holding device 440, in particular the holding plate 441, namely slidably with a linear degree of freedom of movement LZ parallel to the follower rotational axis M, as well as across to the follower rotational axis M and also by one or more degrees of freedom of rotation, namely about the axes SY and SX.

The bearing device 455 has for this purpose a multi-joint rotary bearing 456 designed as a ball bearing. By way of example, for this purpose, a bearing body 459, which is spherical on its outer periphery or spherical segment-shaped, is pivotally mounted in a bearing body 458, which is stationary relative to the holding device 440, by way of example, arranged on the holding plate 441, namely in a bearing recess 456A.

The bearing body 459 in turn has a sliding bearing receptacle 457A, which is provided in a sliding bearing 457. The bearing recess 457A is penetrated by a bearing section 433 of the bearing body 430, which protrudes from the follower 420. The bearing section 433 can thus be displaced linearly in the bearing recess 457A relative to the axis GZ or the follower rotational axis M and pivot about a single axis or multiple axes transverse to this axis by means of the swivel bearing 456. The linear displaceability is shown in dashed lines in the cross-sectional view. The pivoting mobility is also indicated by dashed lines in the side view, but with particular graphical emphasis.

Of course, the frictional engagement surface 681 can also be designed differently, so that, by way of example, one of the frictional engagement bodies 780 or 880 is arranged there.

Of course, in the case of the sensor device 10, on the end wall 21A one of the frictional engagement bodies 680, 780 or 880 can also be readily arranged, by way of example adhesively bonded or similar. Furthermore, the particles 683 can also be embedded directly in the end wall 21A. By way of example, the follower 20 is made of a plastic material, in particular an elastic plastic material, in particular a rubber material, into which particles, in particular corundum, glass fragments or similar other sharp-edged particles can be readily interspersed during the manufacturing process.

The principle of having particles on frictional engagement surfaces can also be easily applied to the sensor devices 110, 210 or 310, by way of example, if the follower surfaces 121, 321 are provided with particles 683.

However, it would also be possible, as schematically shown in FIGS. 17 and 18, for example, for a frictional engagement body 980 to be arranged on the end face 188 of the trailer coupling 180 and/or on the follower surface 121, 321, on which frictional engagement body particles 683 are provided. With the trailer coupling 180, the frictional engagement body 980 forms a counter follower element 990.

In principle, the construction of the frictional engagement body 980 is similar to that provided for the frictional engagement bodies 680, 780 or 880, i.e. that on opposite sides, on one side an adhesive layer 686 and on the other side a support layer 684 are provided for the particles 683. For example, the particles 683 protrude from a support surface 982 of the frictional engagement body 980 in the manner of pyramids, on the rear side of which the adhesive layer 686 is provided.

On these follower surfaces 121, 321 projections or follower projections or positive-locking projections can easily be provided, similar to the concept explained below:

A sensor device 510 for a towing vehicle coupling 560 is arranged, by way of example, directly on its coupling element 561, by way of example a coupling ball 562. The follower 520 is annular and extends near the equator of the ball 562, but not on the equator of the ball. The annular follower 620 can rotate about a follower rotational axis M, about which it is rotatably mounted on the coupling element 561. The follower 520 is rotatably supported in a bearing recess 518 extending on the radially outer periphery, close to the ball surface of the ball 562, over the entire outer periphery thereof. Of course, a partial annular configuration of a follower of the type described below would also be possible.

Furthermore, the coupling element 561 has a sensor recess 517, in which an evaluation device 512 and a sensor 511 for detecting signals from sensor transmitters 25, by way of example magnets, are arranged. The follower 520 has a follower body 527, which is fastened to a follower carrier 524. The follower carrier 524 has one or more sensor transmitters 25, which are arranged in a ring and extend around the follower rotational axis M. Thus, when the follower carrier 524 rotates about the follower rotational axis M, the magnets or other sensor transmitters rotate past the sensor 511, so that this can detect a respective angular position.

For better support of the evaluation device 512 in the sensor recess 527, this is embedded, by way of example, in a holding mass 519 or similar other holding body. This body also comprises a section of the bearing groove or bearing recess 518.

The follower 520, in particular its follower body 660, has at its radial outer periphery 522 a plurality of follower projections 521, between which spacings or gaps 523 are arranged. The follower projections 521 can be pushed into the gaps 523, when a pressure coming radially from the outside, namely by, by way of example, the trailer coupling 180 or its coupling counter element 181, acts on a follower projection 521.

On each of the follower projections 521 a plurality of particles 683, by way of example, rock particles, corundum, diamond or similar, are arranged, the tips of which protrude radially outward from the respective follower projection 521 and accordingly are able to create a frictional contact on the coupling counter element 181 when the trailer coupling 180 is coupled to the towing vehicle coupling 560.

The coupling element 561 is arranged on a coupling arm 565 and can be adjusted by means of a bearing 570 between a use position GS and a nonuse position NG, by way of example, pivot about a single axis or multiple axes and/or linearly displaced or similar. Of course, it is possible to lock the coupling arm 565 in the use position GS and/or the nonuse position NG by a locking device, not shown, and/or to adjust it manually or by motor between the two positions. A suitable drive motor is not shown, for reasons of simplicity.

In the nonuse position NG, the coupling arm 565 is hidden behind a rear contour, by way of example a rear apron, of a towing vehicle Z3, on which the towing vehicle coupling 560 is arranged.

| | |
|---|---|
| 10 | Sensor device |
| 11 | Sensor |
| 12 | Evaluation device |
| 13 | Processor |
| 14 | Storage device |
| 15 | Bus coupler interface |
| 16 | Housing |
| 65 | Bearing surface/Support surface |
| 66 | Slide bevel |
| 67 | Receiving space below 70 |
| 68 | Insertion bevels on 62 |
| 69 | Front side |
| 20 | Follower 20A Follower body |
| 21 | Follower surface 21A End wall |
| 22 | Peripheral wall 22A Bevel |
| 23 | Base wall |
| 24 | Sensor carrier |
| 25 | Sensor transmitter/magnet |
| 25B | Ring arrangement |
| 26 | Sensor element recess |
| 27 | Peripheral follower contour |
| 28 | Elastic section |
| 29 | Protective housing 29A Interior |
| 30 | Bearing body 30A Receiving space |
| 31 | Flange projection |
| 32 | Bearing arrangement |
| 33 | Pivot bearing from above |
| 34 | Pivot bearing from below |
| 35 | Anti-rotation lock |
| 36 | Screw 36A Screw recess |
| 37 | Channel for leads |
| 38 | End face at magnet |
| 39 | Support body of lower pivot bearing |
| 40 | Holding device |
| 41 | Holding plate |
| 42 | Holding projections of 41 |
| 43 | Passage opening for screws |
| 44 | Screws 44A Head |
| 45 | Receiving recess for bearing body |
| 46 | Passage opening for leads |
| 47 | Carrier |
| 50 | Force-applying means |
| 51 | Spring arrangement |
| 52 | Springs |
| 53 | Magnet |
| 54 | Screen 54A Screening wall |
| 60 | Towing vehicle coupling |
| 60A | Fifth-wheel coupling |
| 61 | Coupling element |
| 61A | Mounting plate |
| 62 | Insertion recess |
| 63 | End face in the backwards direction of travel |
| 64 | Upper side 61 |
| 70 | Coupling recess pin up |
| 71 | Cylindrical inner contour |
| 72 | Support body |
| 73 | Ribs Rib structure |
| 74 | Underside |
| 75 | Locking device |
| 76 | Locking body |
| 77 | Locking drive |
| 78 | |
| 79 | |
| 80 | Trailer coupling |
| 81 | Coupling counter element |
| 82 | Pin/King pin |
| 83 | Upper side |
| 84 | Flange body |
| 85 | Support surface on 84 |
| 86 | Outer periphery contour of 82 |
| 87 | Locking recess |
| 88 | End face |
| 89 | Slide bevel |
| 90 | Follower surface |
| 91 | Pin section |
| 95 | Joint |
| Z | Towing vehicle Z2 Z3 |
| N | Vehicle electrical system |
| A | Trailer vehicle A2 |
| BR | Viewing direction |
| 110 | Sensor device |
| 111 | Sensor |
| 112 | Evaluation device |
| 13 | Processor |
| 14 | Storage device |
| 115 | Interface/radio module |
| 116 | Receiver |
| 161 | Coupling element |
| 162 | Ball head |
| 163 | Cylindrical section/Shaft |

| | |
|---|---|
| 120 | Follower |
| 121 | Follower surface |
| 122 | Follower body |
| 123 | Bearing section |
| 124 | Support section for springs |
| 125 | Sensor transmitter Magnet |
| 170 | Vehicle mount 270 Bearing |
| 130 | Bearing body |
| 172 | Plug-in recess |
| 140 | Holding device |
| 141 | Clamping screw |
| 175 | Locking device |
| 150 | Force-applying means |
| 151 | Spring arrangement |
| 152 | Springs |
| 153 | Magnet |
| 180 | Trailer coupling |
| GZ | Joint rotational axis z |
| GX | Joint rotational axis x |
| GY | Joint rotational axis y |
| 184 | Swivel bearing |
| 185 | Locking device |
| M | Follower rotational axis |
| 187 | Locking element |
| DZ | Degree of freedom of rotation Z = M |
| DX | Degree of freedom of rotation X |
| DY | Degree of freedom of rotation Y |
| LX | Lin. degree of freedom of movement |
| LY | Lin. degree of freedom of movement |
| LZ | Lin. degree of freedom of movement |
| 160 | Towing vehicle coupling |
| 164 | Arm section |
| 165 | Coupling arm |
| 166 | Mounting section |
| 167 | Positive-locking contour |
| 168 | Recess |
| 171 | Receiving body |
| 173 | Locking recess |
| 174 | Positive-locking counter contour |
| 176 | Locking body |
| 177 | Actuating body |
| 178 | Drive/Gearbox |
| 179 | Manual actuating element |
| 181 | Coupling counter element |
| 182 | Coupling recess |
| 183 | Mounting sectionfor drawbar |
| 186 | Manual actuating element |
| 188 | End face about coupling recess |
| 195 | Joint |
| DV | Data connection |
| V1 | Supply connection |
| V2 | Supply connection |
| VX | Lead arrangement |
| 645 | Holding section |
| 641A | 641B Fastening parts |
| 644 | Bearing body |
| 644A | Head |
| 644B | Bearing section |
| 6440 | Fastening section |
| 650 | Force-applying means |
| 651 | Spring arrangement |
| 652 | Springs |
| 653 | Magnet |
| 653A | Free end face of 653 |
| 654 | Screen |
| 654A | Base wall |
| 654B | Peripheral wall |
| 655 | Bearing device |
| 656 | Swivel bearing/Ball bearing |
| 656A | Bearing recess |
| 657 | Sliding bearing |
| 657A | Bearing recess |
| 658 | Bearing body in 643 |
| 659 | Bearing body ball |
| 660 | Follower body |
| 661 | Main body |
| 662 | Recesses |
| 663 | Recess for magnet |
| 664 | Passage opening for screws |
| 665 | Screws |
| 666 | Underside of 660 |
| 667 | Follower carrier |
| 668 | End wall |
| 669 | Screw recesses |
| 680 | Frictional engagement body |
| 681 | Frictional engagement surface |
| 682 | Support surface |
| 683 | Particle |
| 684 | Support layer Bonding layer |
| 685 | Base layer |
| 686 | Adhesive layer |
| 687 | Pyramid apexes |
| 688 | Edges of the particles |
| 689 | Rays |
| 690 | Central surface |
| 691 | Enveloping |
| 692 | Cover layer |

The invention claimed is:

1. A sensor device for a towing vehicle coupling or as a component of a towing vehicle coupling, with which a trailer vehicle, in particular a semi trailer, can is configured to be coupled to a towing vehicle, in particular a truck, wherein the towing vehicle coupling has a coupling element for detachably coupling a coupling counter element, one of which is or can be secured to the towing vehicle and the other of which is or can be secured to the trailer vehicle, and in the coupled state forming a joint, they can rotate relative to one another about at least one joint rotational axis, wherein the sensor device has a follower, which is mounted such that it can rotate relative to the coupling element about a follower rotational axis, and which can rotate about the follower rotational axis by rotationally following the coupling counter element during rotation about the at least one joint rotational axis for detecting a rotation of the coupling counter element relative to the coupling element about the at least one joint rotational axis, wherein the follower has at least one frictional connection surface for frictional contact with the coupling counter element, and wherein the sensor device has at least one sensor for detecting a respective rotational position of the follower relative to the coupling element in relation to the follower rotational axis, wherein a plurality of particles for contacting the coupling counter element is arranged on the at least one frictional connection surface and/or in that it has a counter follower element which is arranged or can be arranged on the coupling counter element and which has a follower surface having a plurality of particles for contacting the frictional connection surface.

2. The sensor device according to claim 1, wherein the particles are embedded in a support surface of the follower and protrude in the manner of contact projections from the support surface.

3. The sensor device according to claim 1, wherein the particles are embedded in an elastic material, of the follower and protrude in the manner of contact projections from the material.

4. The sensor device according to claim 1, wherein the particles are harder than a material of the follower supporting them, wherein the particles protrude from the material.

5. The sensor device according to claim 1, wherein the particles protrude freely from a support surface of the follower on which the particles are arranged.

6. The sensor device according to claim 1, wherein the particles are covered by a cover layer on their side facing away from the support surface.

7. The sensor device according to claim 1, wherein the follower has a follower carrier to which the carrier body is detachably fastened, wherein the at least one frictional engagement surface is provided on the follower body.

8. The sensor device according to claim 1, wherein the follower body has a slide bevel for sliding the coupling counter element.

9. The sensor device according to claim 1, wherein the follower body circularly surrounds the follower carrier and/or forms a cap or a cover for the follower carrier and/or protrudes transversely to the follower rotational axis from the follower carrier.

10. The sensor device according to claim 1, wherein the follower body has at least one magnet for generating a magnetic attraction in the direction of the coupling counter element.

11. The sensor device according to claim 1, wherein the particles have a plurality of regularly or irregularly oriented edges.

12. The sensor device according to claim 1, wherein the particles are arranged chaotically or randomly on the frictional engagement surface.

13. The sensor device according to claim 1, wherein the particles are arranged scattered closed or scattered openly on the frictional engagement surface and/or the frictional engagement surface has zones with different densities of particles.

14. The sensor device according to claim 1, wherein the frictional engagement surface has at least one region without particles.

15. The sensor device according to claim 1, wherein the particles are provided on zones of the frictional engagement surface which are spaced apart from one another.

16. The sensor device according to claim 1, wherein an envelope of the particles defining the contact region with the coupling counter element is a flat surface or an even surface or a spherical segment surface.

17. The sensor device according to claim 1, wherein at least one positive-locking is arranged on the follower for positive-locking contact with the coupling counter element.

18. The sensor device according to claim 17, wherein the at least on positive-locking contour has a frictional engagement surface with a plurality of particles for contact with the coupling counter element.

19. The sensor device according to claim 1, wherein the follower has at least two follower projections, which follower projections have a spacing from one another, wherein at least one follower projection has a frictional engagement surface with a plurality of particles on its end face for contact with the coupling counter element.

20. The sensor device according to claim 1, wherein the follower has at least one elastic section for elastic deformation by the coupling counter element.

21. The sensor device according to claim 1, wherein it has a magnet arrangement with at least one magnet for providing a magnetic attraction force impinging on the follower in the direction of the coupling counter element and/or a spring arrangement for providing a spring force impinging on the follower in the direction of the coupling counter element.

22. The sensor device according to claim 21, wherein the magnet arrangement is configured and/or arranged for the actuation or excitation of the at least one sensor.

23. The sensor device according to claim 21, wherein it has a screening device for screening the at least one sensor from magnetic influences of the magnet arrangement.

24. The sensor device according to claim 1, wherein the follower has at least one follower ring or annular section and/or in that the follower has a dome-shaped or tower-like follower body.

25. The sensor device according to claim 1, wherein it has a sensor or sensor transmitter mounted so that it can rotate about the follower rotational axis, which is rotationally coupled or rotationally connected to the follower.

26. The sensor device according to claim 1, wherein it comprises a ring arrangement of a plurality of sensors or sensor transmitters arranged about the follower rotational axis.

27. The sensor device according to claim 1, wherein at least some of the particles have a crystalline structure or are mineral and/or are generated by breaking or crushing a hard material.

28. The sensor device according to claim 1, wherein the particles contain or are formed by metal.

29. The sensor device according to claim 1, wherein the particles contain or are formed by ceramic material and/or stone material and/or sand and/or corundum.

30. The sensor device according to claim 1, wherein the particles contain and/or are formed by quartz and/or diamond and/or silicon carbide and/or silicon and/or cubic boron nitride and/or aluminium oxide.

31. The sensor device according to claim 1, wherein the particles contain and/or are formed by glass and/or plastic.

32. The sensor device according to claim 1, wherein the particles are glued to a carrier material of the follower using glue and/or synthetic resin.

33. The sensor device according to claim 1, wherein the follower is mounted such that it moves relative to the coupling element for providing or maintaining a follower coupling to the coupling counter element by at least one degree of freedom of movement, that is different to the rotatability about the follower rotational axis.

34. The sensor device according to claim 1, wherein it has a frictional engagement body that can be or is secured to the follower or, to provide the counter follower element, to the coupling counter element, on which frictional engagement body the plurality of particles is arranged.

35. The sensor device according to claim 34, wherein the frictional engagement body is a circular or annular plate body and/or has an adhesive layer for gluing to the coupling counter element or the follower.

36. The towing vehicle coupling with a sensor device according to claim 1.

* * * * *